United States Patent [19]

Ishai et al.

[11] Patent Number: 5,715,413
[45] Date of Patent: Feb. 3, 1998

[54] DRAGGING AND DROPPING WITH AN INSTANTIATION OBJECT

[75] Inventors: Yuval Ishai, Haifa, Israel; Christopher Thomas Kello, Pittsburgh, Pa.; Mila Keren, Neshez, Israel; Richard Kirchhofer, Fremont, Calif.; Lev Kozakov; Zvi Yosef Yehudai, both of Haifa, Israel

[73] Assignee: International Business Machines Corporation, Armonk, N.Y.

[21] Appl. No.: 670,072

[22] Filed: Jun. 25, 1996

[51] Int. Cl.⁶ .................................................. G06F 3/00
[52] U.S. Cl. .......................... 395/349; 395/340; 395/347; 395/670; 395/614
[58] Field of Search .................... 395/326–358, 395/614, 670, 611, 601, 616, 680, 613; 364/489

[56] References Cited

U.S. PATENT DOCUMENTS

| | | | |
|---|---|---|---|
| 4,686,522 | 8/1987 | Hernandez et al. | 340/709 |
| 4,703,321 | 10/1987 | Barker et al. | 340/747 |
| 5,161,225 | 11/1992 | Abraham et al. | 395/600 |
| 5,247,669 | 9/1993 | Abraham et al. | 395/600 |
| 5,287,447 | 2/1994 | Miller et al. | 395/348 X |
| 5,335,346 | 8/1994 | Fabbio | 395/600 |
| 5,392,389 | 2/1995 | Fleming | 395/349 |
| 5,394,522 | 2/1995 | Sanchez-Frank et al. | 395/349 |
| 5,428,734 | 6/1995 | Haynes et al. | 395/349 |
| 5,490,244 | 2/1996 | Isensee et al. | 395/349 |
| 5,491,784 | 2/1996 | Douglas et al. | 395/352 |
| 5,500,929 | 3/1996 | Dickinson | 395/356 |
| 5,502,805 | 3/1996 | Anderson et al. | 395/340 X |
| 5,506,952 | 4/1996 | Choy et al. | 395/352 X |
| 5,530,865 | 6/1996 | Owens et al. | 395/680 |
| 5,544,305 | 8/1996 | Ohmaye et al. | 395/326 |
| 5,546,519 | 8/1996 | Berry | 395/326 |
| 5,546,527 | 8/1996 | Fitzpatrick et al. | 395/348 |
| 5,548,702 | 8/1996 | Li et al. | 395/346 |
| 5,555,370 | 9/1996 | Li et al. | 395/334 |
| 5,557,731 | 9/1996 | Li et al. | 395/613 |
| 5,606,674 | 2/1997 | Root | 395/348 X |
| 5,610,828 | 3/1997 | Kodosky et al. | 364/489 |
| 5,621,878 | 4/1997 | Owens et al. | 395/326 |
| 5,638,505 | 6/1997 | Hemenway et al. | 395/348 |
| 5,642,490 | 6/1997 | Morgan et al. | 395/339 X |

*Primary Examiner*—John E. Breene
*Attorney, Agent, or Firm*—Baker, Maxham, Jester & Meador

[57] ABSTRACT

A graphical user interface (GUI) application program implemented in an object oriented programming language permits a user to instantiate new program objects by dragging an instantiation object from one GUI window to a new GUI window and dropping the instantiation object in the new window. When the instantiation object is dropped into the new window, an object specified by the new window type is automatically instantiated. If needed, the user is automatically prompted to provide parameters needed for the object instantiation according to the window in which the object is dropped.

30 Claims, 13 Drawing Sheets

FIG. 16

Filtering Information

Condition Information
Condition Name [Cond_3]
Left side of the condition [size_1]
Relation [>]
Right side of the condition [size_2]
○ Constant  ● Ranges
[Save to Pool]

Pool of simple conditions

| Name   | Left Side | Relation | Right Side |
|--------|-----------|----------|------------|
| Cond_1 | Range_1   | =        | date       |
| Cond_2 | date      | >        | 12.3.94    |
| Cond_3 | size_1    | >        | size_2     |

[&] [|] [<>] [()]

[Remove]

Final selection condition
Cond_1 and ( Cond_2 or Cond_3 )

[OK] [Save] [Cancel] [Help...]

FIG. 17

Output Preview

Input Records to Preview
From Record # [1]  To # [6]

Preview Criterion
☑ Sorted  ☑ Filtered  ☐ Reformatted

Preview Window

[OK] [Start Preview] [Help...]

DRAGGING AND DROPPING WITH AN INSTANTIATION OBJECT

BACKGROUND OF THE INVENTION

1. Field of the Invention

The present invention relates to data processing systems and, more particularly, to graphical user interfaces for operation of application programs.

2. Description of the Related Art

A Graphical User Interface (GUI) is a type of computer program interface that provides a convenient means of controlling the operation of a computer system application program. The GUI typically represents data and computer system resources as display icons shown on a display of the computer system. The icons can be display buttons, uniquely shaped objects, or items in a list. A user selects an operation and then designates data or resources on which the operations will be performed. Operations are frequently represented as items in a list or fields in a drop-down menu.

A GUI user manipulates a graphical interface input device, such as a display mouse, trackball, or joystick, to control a display cursor and thereby select data and resources for application program operations. A user selects an operation by highlighting an item or field and pressing a graphical input device button. To execute a desired operation on data, a user first must consider the operation, then consider the data or system resource involved and select it, and next consider again the operation and select it, potentially scanning a long drop-down menu or list of operations from which the desired operation must be designated. This sequence of thoughts and actions is not intuitive because it requires repeated back and forth thinking about data, resources, and operations.

Many GUI programs are implemented in object-oriented programming languages, such as the C++ programming language. The display icons that represent data or resources are typically representations of data structures called objects, which encapsulate attributes and behaviors. Objects are specified by definitions, called classes, that specify the attributes and behaviors of the particular objects, which are instances (called instantiations) of the class definitions. Object-oriented programming languages make it easier for system programmers to implement the GUI concepts of icons and lists. For example, if the GUI icons are represented as object-oriented programming objects, the GUI program can be written so that the status of the icon is continuously updated. In this way, it is relatively simple for the GUI program to be written so that the icons can be selected with the graphical user input device and moved about on the computer system display to a desired operation.

With respect to executing GUI operations, it would be more intuitive to first select an object that represents an operation and then move the operation object to a data object or resource. Most GUI programs with such a facility, however, provide only limited operations for selection by a user. Operations that include various operator parameters and options are not supported as movable icons. For example, a delete operation might be represented with a single object such as a trash can and data files might be moved to it for deletion. Most GUI operations that produce new objects, however, require more complicated specification of parameters and therefore are currently unsupported in the operation-moving scheme.

For example, data base management systems are used for storage and management of large amounts of data. The data can comprise, for example, employee information for a company having thousands of employees, product and stock information concerning the inventory of a distribution company, or supply and material information for a manufacturing company. The data can represent thousands of pages of printed information and typically is stored on data storage devices such as magnetic tape, magnetic or magneto-optical disks, integrated circuit chips, and the like.

The data can often be arranged in tables, each table comprising rows and columns of cells that contain information. Information from one or more cells of a table is generally referred to as a record. One or more records can be stored serially or otherwise linked together with other records to form a file, which can be retrieved, manipulated, and stored to and from a data storage device. A file is conveniently referenced by a file name.

A data base management system (DBMS) typically supports a query language or other programming languages with which a user can perform the data manipulation and management functions. A user of the DBMS can set up one or more databases in which data is stored and can use the query language to retrieve selected data from the database, process the data in the database, and organize the processed data into output reports.

In a DBMS implemented in an object-oriented programming language, many operations can generate new data represented as instantiations of objects. For example, a user might wish to extract a portion of a first table, copy it, and move the copy to another table. The extracted portion might conveniently be represented as a movable display icon, which therefore is an instantiation of a class object of the data base management program. The sequence of operations necessary for instantiation can be rather complicated, because the class parameters that must be specified before an appropriate object can be instantiated might change depending on the operation desired.

A user of a DBMS does not need any knowledge of the internal data file structure to specify standard data operations typically supported by the data processing engine (DPE) of the DBMS. However, to specify non-standard data operations to be carried out on the database files using the DBMS or another DPE, a user must have substantial knowledge about how the data is organized in the database. The same situation might take place if a user needs to carry out data operations on flat files, such as conventional text files, that have no predefined record structure. In such cases, specifying the data operations can be rather tedious.

For example, if data is arranged into tables, it might be necessary to know the exact number of rows and columns, and the nature of the information contained in each cell of the table. The range of the operation, comprising a specification of the particular data records that are the subject of the data operations, must be carefully described, to ensure the data operations are carried out over the appropriate data records. Finally, files that are the subject of the data operations often must be specified by file name, with designation of the particular data records within a file and operations to be carded out for each file.

Each time an operation is to be carried out, it is necessary to carefully put together the appropriate string of commands to invoke the appropriate operation on the desired portion of a particular data file. This makes it difficult to permit execution of data base management GUI operations by selecting an object that represents an operation and then moving the operation object to a data or resource object.

Some GUI programs permit automatic instantiation of objects upon selecting a desired template. Such schemes, however, require the user to determine the correct template for the object to be instantiated, select the new template, and drag a template object to the desired destination window.

From the discussion above, it should be apparent that there is a need for a simplified graphical user interface that permits simpler user interaction. Such an interface would make it easier for a user to specify program operations and the data or resources involved in an operation and would automatically instantiate appropriate objects. The present invention satisfies this need.

SUMMARY OF THE INVENTION

The present invention provides a graphical means of instantiating new objects in an object oriented GUI program by dragging an instantiation object from one GUI window to a new GUI window and dropping the object in the new window. When the instantiation object is dropped into the new window, an object specified by the new window type is automatically instantiated. Parameters needed for the object instantiation will be specified by the window in which the object is dropped, which will be automatically known to the GUI program. In this way, users can drag objects representing data or resources to operators (or windows) and reliably instantiate new objects with desired attributes and behaviors. A GUI program using the graphical object instantiation feature of the invention provides an easier way for a user to specify a program operation and the data or resources involved in the operation.

In one aspect of the invention, a GUI application program includes a Creator Object that can be dragged to an operation window and dropped. When the Creator Object is dropped in the operation window, an object that would result from an operation specified by the window is automatically created by the GUI application program. A display management function of the GUI application program is informed of the display location of the Creator Object as it is dragged from window to window, and therefore can command the instantiation of objects that are appropriate to the window in which the Creator Object is located. In this way, it is not necessary for a user to select from a template or other object-defining icon to ensure instantiation of the correct object type.

When a user selects the Creator Object, the GUI application program can permit the user to specify attributes and behaviors of the object to be instantiated by providing an appropriate display panel. The user then provides parameters and specifications for the object to be instantiated. Afterwards, each time the user selects the Creator Object, the associated attributes and behaviors desired by the user will be automatically known to the GUI application program.

In another aspect of the invention, the Creator Object can be dragged to an object that represents an operation, rather than a window that represents an operation, and the GUI application program can instantiate the appropriate object. Again, after selecting the Creator Object, it is not necessary for the user to select from an object template or creation palette to ensure instantiation of the correct object type. Rather, the GUI application program will automatically execute instantiation of an object with the appropriate user-selected parameters.

Other features and advantages of the present invention should be apparent from the following description of the preferred embodiment, which illustrates, by way of example, the principles of the invention.

BRIEF DESCRIPTION OF THE DRAWINGS

FIG. 16 is a representation of a Filter Information display panel of the data arranger program executed by the computer system illustrated in FIG. 1.

FIG. 17 is a representation of an Output Preview display panel of the data arranger program executed by the computer system illustrated in FIG. 1.

DETAILED DESCRIPTION OF THE PREFERRED EMBODIMENT

Computer System Components

Figure 1:
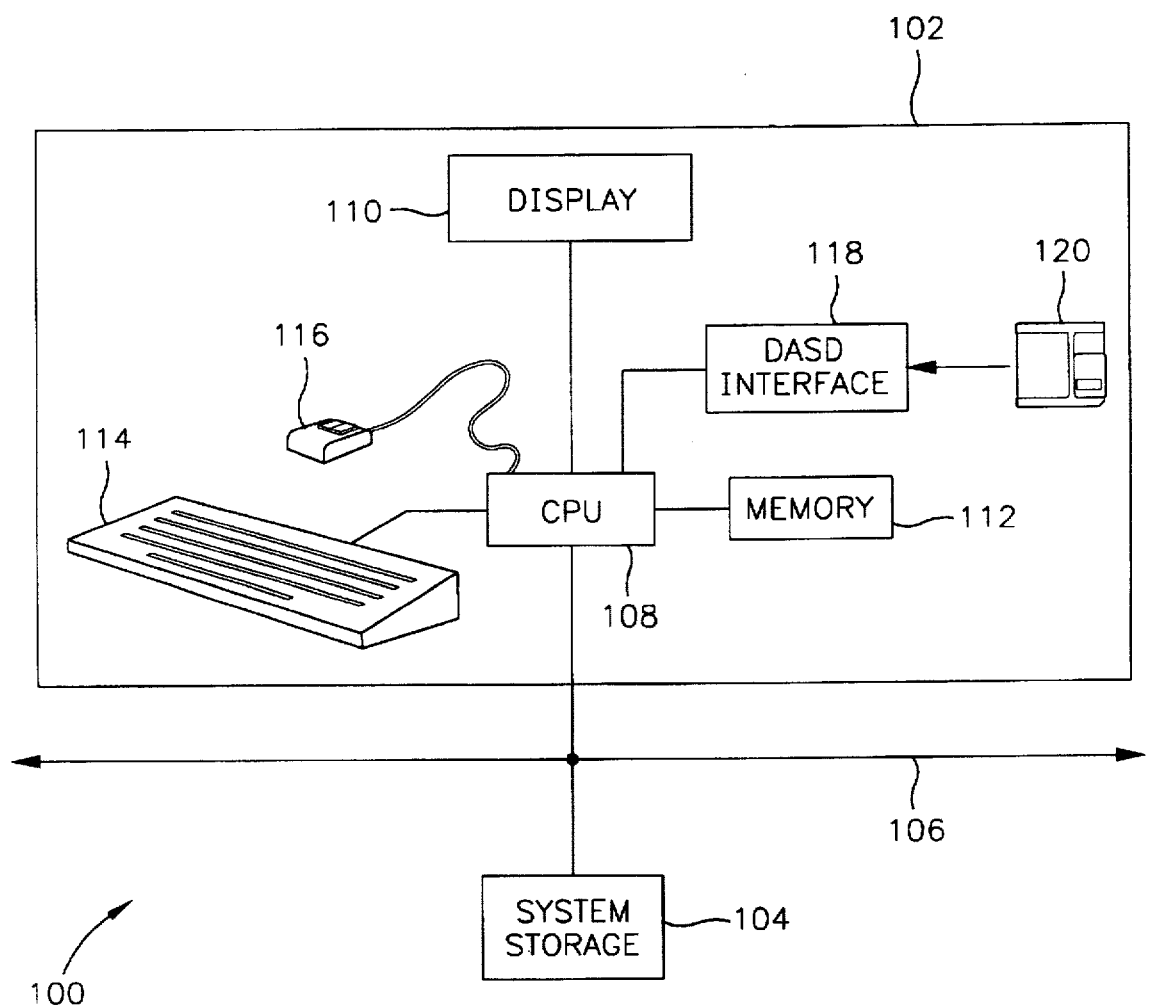
FIG. 1 is a block diagram of a computer system constructed in accordance with the present invention.

FIG. 1 is a block diagram of a computer system 100 constructed in accordance with the present invention. The computer system includes a user station 102 that communicates with a system storage unit 104 over a network 106. The system storage unit 104 comprises a direct access storage device (DASD), such as magnetic disk storage, in which data files are stored. The user station 102 includes a central processing unit (CPU) 108, a display 110, and a main memory 112. The CPU operates in response to user commands, which it receives via a keyboard 114 or a graphical interface input device 116, such as a display mouse, joystick, or track ball. The user station 102 can communicate with one or more other user stations or a network server unit over the network 106.

The user station 102 includes a DASD interface 118 that can receive and read computer program products 120 comprising machine-readable storage devices such as, for example, integrated circuit chips or magnetic media disks or tapes, on which are recorded program instructions or data. The machine-readable storage devices also can comprise, for example, media such as optical disks. The user station 102 also communicates with other user stations, servers, or mainframe computers over the network 106. The other systems can comprise, for example, computer systems similar in construction to the exemplary user station. In that way, the user station can receive data into the main memory 112 over the network 106 after network communication has been established using well-known methods that will be understood by those skilled in the art without further explanation.

The main memory 112 contains a variety of data structures and information, including an operating system, application programs, program objects, and user data. The main memory is represented as a single entity, but those skilled in the art will appreciate that the main memory can comprise a combination of random access memory (RAM), hard disk drives, optical disk drives, and other storage devices containing logically segmented storage locations. The main memory includes a data arranger application program containing a sequence of program instructions whose execution implements the present invention.

The operating system contained in the memory 112 supports an object-oriented programming environment for the execution of object-oriented programs, such as those written in, for example, the C++ programming language. Accordingly, the memory contains program objects that are data structures of an object-oriented programming language. Application programs are invoked, or launched, by a user through the keyboard 114 or graphical input device 116. The application programs can be written in a variety of languages, including C++.

The CPU 108 can comprise any one of many platforms, including the International Business Machines Corporation (IBM Corporation) Model PS/2® personal computer, IBM Corporation Model RS/6000 workstation, and the like. In the preferred embodiment, the graphical input device 116 comprises a display mouse, but it can be substituted with other devices that provide the same function and control, such as a track ball or joystick, which are well-known to those skilled in the art and require no further explanation. Thus, references to the display mouse will be understood to include alternative devices such as track ball and joystick controllers. Likewise, references to mouse buttons and other mouse features will be understood to include equivalent mechanisms for track balls, joystick devices, and the like.

The display 110 comprises a display device such as a video terminal that displays computer output and indicates system operations. Display objects can be pictured on the display and the user can designate data operations on the display by using the graphical user input device 116.

Data Arranger Interface

In the preferred embodiment, the user station 102 includes an operating system with a data arranger application program having a graphical user interface (GUI) that provides a window operating environment, which is well-known to those skilled in the art and requires no further explanation. The data arranger program in the memory 112 includes one or more functional elements that receive user inputs, produce output, and manage the display interface by maintaining information that relates to the current position of the display cursor in terms of cursor location relative to the display windows. The program instructions of the GUI operating system and application program reside in the memory 112.

Figure 2:
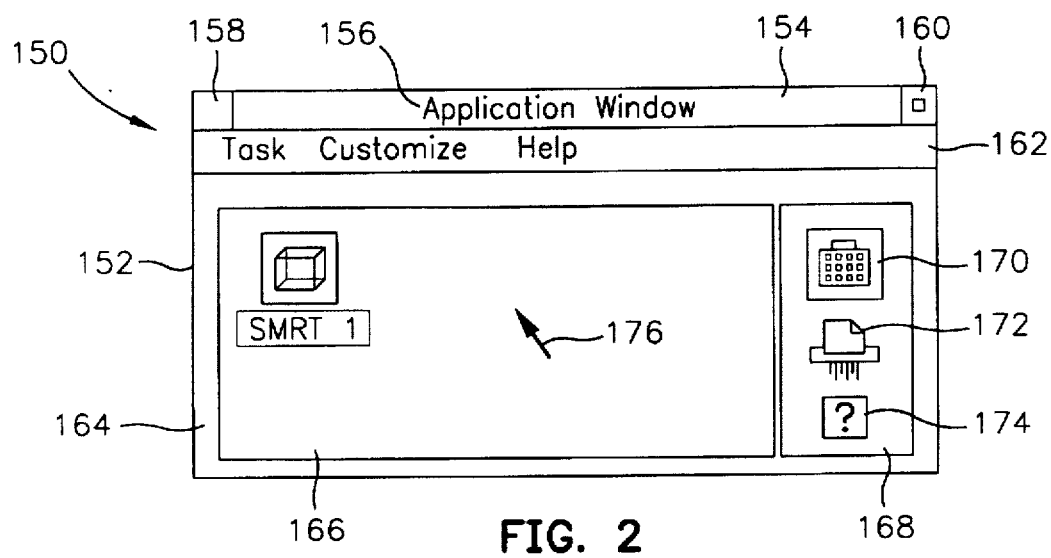
FIG. 2 is a representation of a main display Application Window of the data arranger program executed by the computer system illustrated in FIG. 1, showing a task object of the data arranger program.

FIG. 2 is a representation of a display image that illustrates the window operating environment supported by the GUI operating system of the preferred embodiment, as displayed on the display video terminal 110. Those skilled in the art will appreciate that the GUI operating system provides a multi-level operating environment in which multiple application programs and documents, or windows, can be active at the same time. The display image represented in FIG. 2 corresponds to an Application Window display of the data arranger application program of the preferred embodiment.

The FIG. 2 representation comprises a display window 150 having a window frame 152 and a title bar 154. The title bar includes a title 156 labelled "Application Window", a window status icon 158, and a window sizing icon 160. Beneath the title bar is a menu bar 162 showing drop-down selection menu headings entitled "Task", "Customize", and "Help". Those skilled in the art will recognize that these display window elements are generated by the GUI operating system, and will understand that drop-down function lists are displayed when a particular menu bar item (Task, Customize, or Help) is selected.

The window frame 152 defines a window working space 164. The data arranger application program permits a user to designate a sequence of application program functions to be represented by a display task icon, which thereafter can be invoked by the user to cause execution of the user-specified instruction sequence. As noted above, the application program of the preferred embodiment is implemented in an object-oriented programming language and the display task icons comprise program objects that encapsulate attributes and behaviors. The program objects, for example, can comprise "objects" as implemented in the C++ programming language. Thus, the terms "Task Object" and "Task Icon" will be used interchangeably and when spelled with initial uppercase letters will be understood to refer to display objects that correspond to a sequence of user instructions that can be invoked for execution.

Displayed within the window working space 164 are a task object space 166 and a command object space 168. The task object space 166 contains any display Task Object that has been created by the user, as described further below, and the command object space contains command objects that represent application program functions. In FIG. 2, the task object space 166 is shown with a Task Object identified as "SMRT 1". The command object space 168 is shown with objects representing data arranger functions. In the preferred embodiment, the command objects comprise a Creator Object 170, a Deletor Object 172, and a help object 174. The Creator Object comprises an instantiation object that can be dragged about the display and dropped into a display window, thereby causing the data arranger program to automatically instantiate a member of a program class according to the window in which the Creator Object is dropped. The Deletor Object operates in the reverse fashion, deleting an object instantiation when dropped in a window.

Data arranger functions can be invoked through selecting one of the command objects in the command space 168 or, alternatively, data arranger functions can be invoked through selection of drop-down menu items, as determined by the implementer of the GUI operating system. For example, if the help object 174 in the command object space is selected, the GUI operating system executes the same instructions as when the "Help" drop-down menu item is selected from the menu bar 162. If the Creator Object is selected while in the command space, a drop-down menu is displayed from which the creation function is selected. If the Creator Object is dragged to another window and dropped, a drop-down menu for the appropriate window is displayed, as described further below. A display cursor 176 is shown in the task object space, but those skilled in the art will appreciate that the cursor can be moved throughout the display with the graphical user input device (display mouse) 116.

Task Objects and Task Properties Panel

As noted above, a Task Object displayed in the task object space 166 (such as "SMRT 1") can be invoked by the user to execute a sequence of instructions associated with the object. The sequence of instructions are defined by the user and comprise data arranger program commands that manipulate data files. A Task Object is invoked, for example, by positioning the display cursor over the Task Object and pressing the "enter" key of the keyboard or by double-clicking on a display mouse button.

A Task Object can be created by selecting a "New" function that is listed by the data arranger program in the "Task" drop-down menu (not illustrated) of FIG. 2 or by dragging the Creator Object 170 from the command space 168 to the task space 166. When a user drags the Creator Object and drops it into the task space, the data arranger program recognizes the action as an indication that the user wants to create a new Task Object. Accordingly, the data arranger program instantiates a new Task Object according to user specifications.

Figure 3:
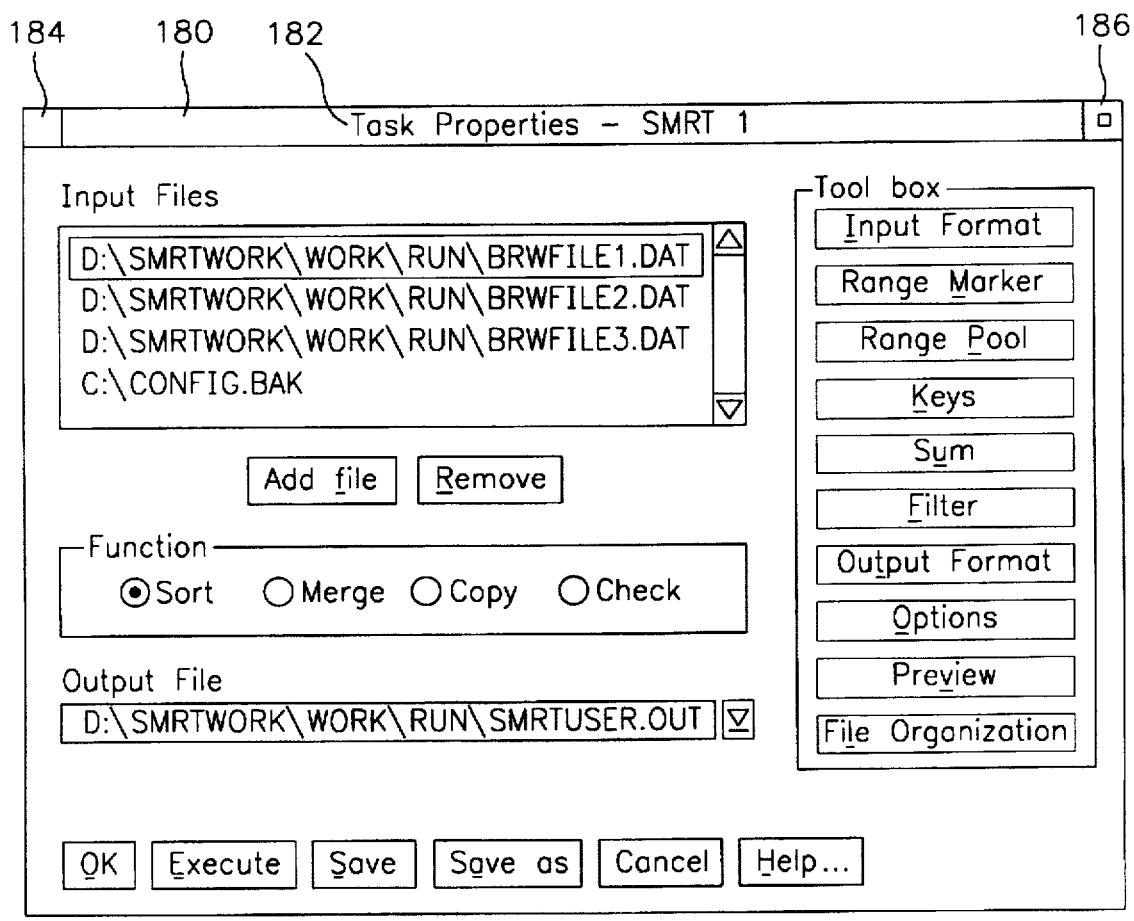
FIG. 3 is a representation of a Task Properties display panel of the data arranger program, showing the display result after dropping the Creator Object illustrated in FIG. 2 into the Application Window task space or otherwise opening the task object illustrated in FIG. 2.

FIG. 3 shows a representation of a Task Properties display panel of the data arranger program. Immediately after a Task Object is newly created, or after an existing Task Object is opened using an "Open" function from the "Task" drop-down menu, the Task Properties display panel is displayed. The Task Properties panel is the means by which a user defines a Task Object. The display shown in FIG. 3 includes a title bar 180, a title 182 that identifies the Task Object, a window status icon 184, and a window sizing icon 186. Beneath the title bar is a window working space having a box labelled "Input Files", a box labelled "Function", a box labelled "Output File", and a panel labelled "Tool box", all of which are associated with further subdivisions of the Task Properties panel. The Task Properties panel also includes various display buttons, typical for application program windows, that can be selected using the graphical input device to position the cursor over the desired display button.

The Task Properties panel of FIG. 3 permits a user to define the sequence of instructions that a Task Object will represent, the specific data files to be used for input, and the data files into which the output from the instructions will be placed. In FIG. 3, several files are listed in the Input Files panel to show that a user can select from multiple file names from multiple data drives. The Output File panel is shown with a named output file to illustrate that a user can specify the name of the file into which output will be stored. Using the Toolbox panel, a user can further define and specify subfunctions of the data arranger program that will be part of the Task Object being defined and that will be included with the sequence performed by the Task Object. The Toolbox panel is described further below.

A user of the data arranger program makes selections from the Task Properties panel and the Toolbox display buttons to define a unique set of functions and subfunctions to be represented by a Task Object. After all the selections have been made, thereby defining all the operating parameters of a Task Object, the user can execute the defined Task Object by selecting the "Execute" display button shown at the bottom of the Task Properties panel. To save the newly defined Task Object, the user selects either the "Save", "Save as", or "OK" display buttons of the Task Properties panel. The "Save as" button will prompt the user for a name to be associated with the created Task Object, and the "Save" and "OK" buttons will use a default (pre-existing) Task Object name. The Task Properties panel is deleted from the display and replaced by the Application Window display (FIG. 2), which will then include the saved Task Object.

A newly created Task Object is saved and retained even after the data arranger program is ended, or terminated, from execution. Thus, the data structures necessary to reconstruct the sequence of program instructions associated with a Task Object are automatically stored in the main memory or other data storage when a user saves a Task Object. At the next invocation of the data arranger program, the saved Task Objects will be displayed in the Application Window and can be selected by the user for execution.

Toolbox of the Task Properties Panel

The subfunctions that can be specified through the Toolbox panel, as illustrated in FIG. 3, are selected through display buttons that include Input Format, Range Marker, Range Pool, Keys, Sum, Filter, Output Format, Options, Preview, and File Organization. When the Toolbox display buttons are selected, a corresponding subpanel is displayed over the Task Properties display panel.

The Input Format panel permits a user to define the structure of records comprising the Task Object input files. The Range Marker panel permits a user to view an input file and mark the input file records or portions of records that are to be represented as display objects called Field Range Objects. In a manner similar to the reference of Task Objects, the phrase "Field Range Object" will be understood to refer to display objects that correspond to a sequence of user instructions that are associated with a data object in an object oriented programming environment. The Field Range Objects will be described further below.

The Range Pool panel is used to collect Field Range Objects so they can be used at a later time. The Keys panel is used to collect Field Range Objects that are to be used in performing sort, merge, or check functions. The Sum panel is used to collect Field Range Objects that define the input over which the data arranger program is to perform a summation operation. The Filter panel permits a user to specify data filtering criteria to the data arranger program for determining the Task Object output data that will be retained in the output file. The Output Format panel is used to collect Field Range Objects that define the structure of the output data file created by the data arranger program. The Options panel permits the user to specify one of several options that provide various features described below. The Preview panel is used to view the configuration of the output data that is created by the data arranger program. Finally, the File Organization panel is used to indicate the file organization attributes of the input and output data files.

Options Panel of the Toolbox

Figure 4:
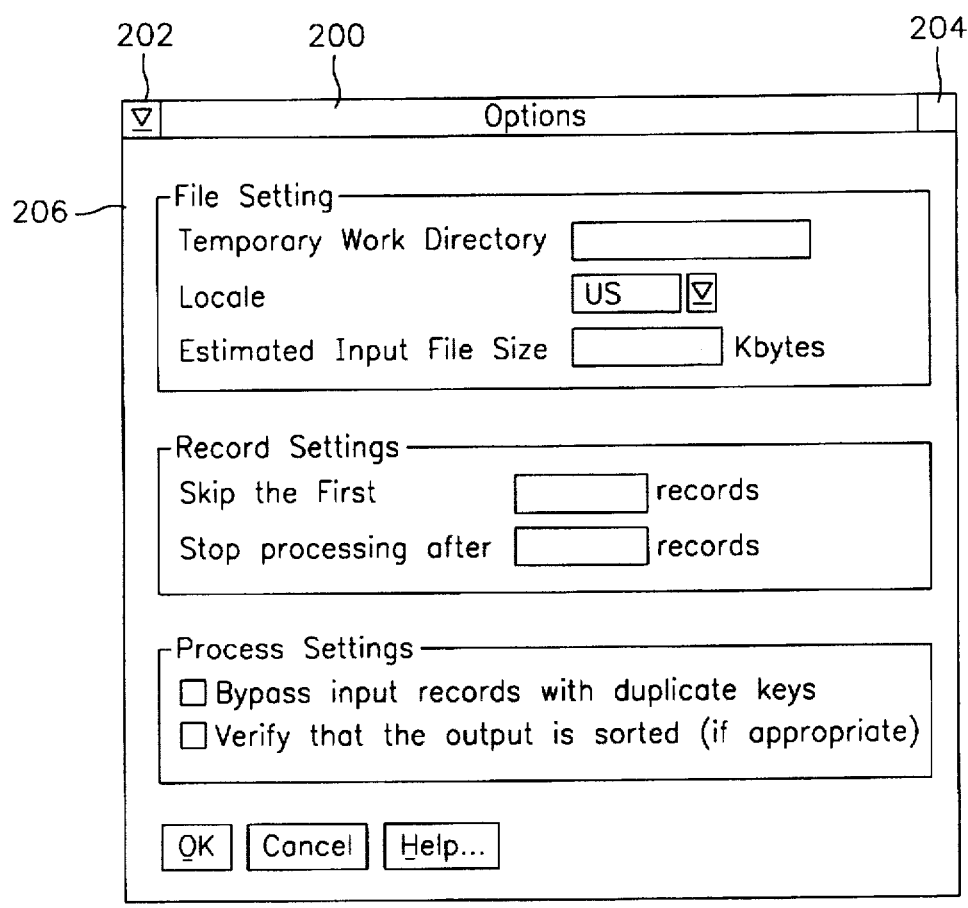
FIG. 4 is a representation of an Options display panel of the data arranger program, showing the display that is produced by selecting the Options display button illustrated in the Task Properties display panel of FIG. 3.

The Toolbox subfunction options a user can select are illustrated by the Options display panel of FIG. 4. The Options display panel shown in FIG. 4 includes a title bar 200, a window status icon 202, and a window sizing icon 204. Beneath the title bar is a window working space 206 having a box labelled "File Setting", a box labelled "Record Settings", and a box labelled "Process Settings". Some of the option selections require user input from the keyboard, such as the work directory option of the file setting box. The Options panel also includes display buttons for "OK", "Cancel", and "Help", which are typical for application program windows. The program actions carried out upon user selection and specification of the various file setting, record setting, and process setting option boxes should be apparent to those skilled in the art from viewing the illustration of FIG. 4 without farther explanation. Additional or different file processing options will also occur to those skilled in the art and may be provided with the data arranger program, as desired.

Field Range Objects

Figure 5:
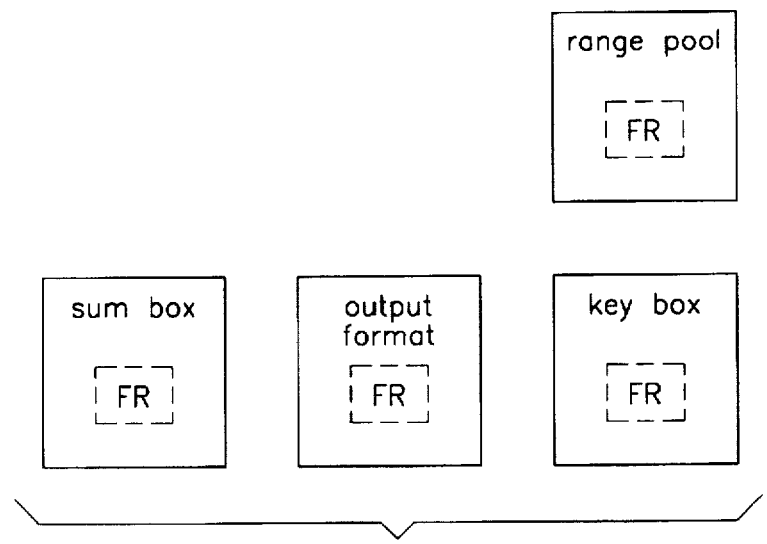
FIG. 5 is a representation of a main display application window showing multiple field range objects located on tool box panels of the data arranger program executed by the computer system illustrated in FIG. 1.

A Field Range Object is analogous to a Task Object in that it encapsulates a sequence of program instructions specified by a user and can be graphically manipulated (copy and delete, for example) using the graphical input device 116. For example, the subfunctions Range Pool, Keys, Output Format, and Sum of the Toolbox panel can be invoked and simultaneously displayed so that one or more Field Range Objects can be specified for each of the subfunctions. FIG. 5 is a representation of the display showing multiple Toolbox subfunction panels, each of which includes a representation of a Field Range Object (shown as "FR" within a box) in its respective subfunction panel. A Field Range Object can be associated with each of the subfunctions and will have slightly different operation, as described next.

Figure 6:
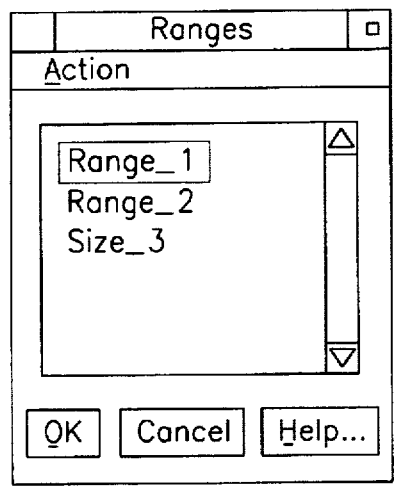
FIG. 6 is a representation of a Range Pool display panel of the data arranger program, showing the display that is produced by selecting the Range Pool display button illustrated in the Task Properties display panel of FIG. 3.
Figure 7:
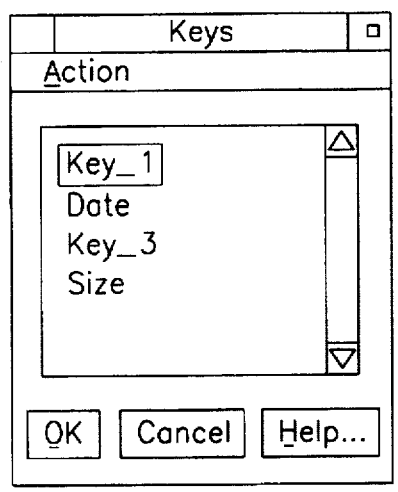
FIG. 7 is a representation of a Key display panel of the data arranger program, showing the display that is produced by selecting the Keys display button illustrated in the Task Properties display panel of FIG. 3.
Figure 8:
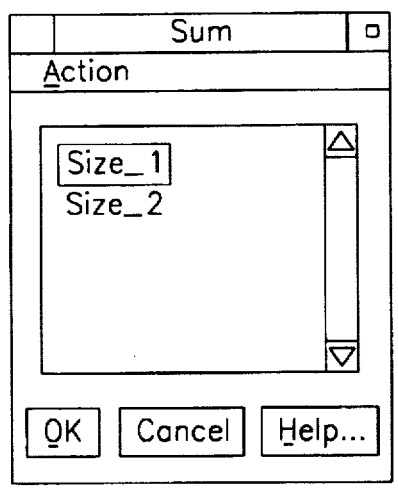
FIG. 8 is a representation of a Sum display panel of the data arranger program, showing the display that is produced by selecting the Sum display button illustrated in the Task Properties display panel of FIG. 3.
Figure 9:
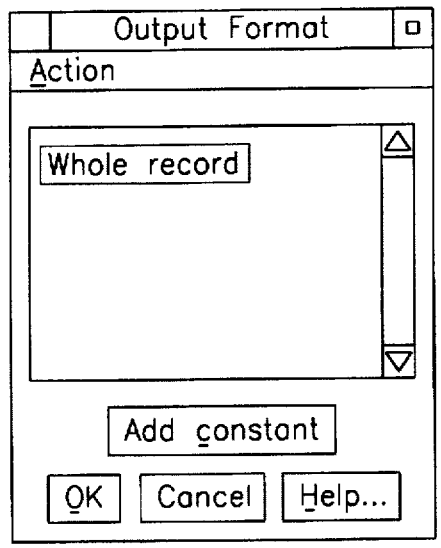
FIG. 9 is a representation of an Output Format display panel of the data arranger program, showing the display that is produced by selecting the Output Format display button illustrated in the Task Properties display panel of FIG. 3.

FIG. 6 shows the Range Pool panel, selected from the Toolbox subpanel (FIG. 2). The Range Pool panel of FIG. 6 shows the name of three Field Range Objects from which the user may select (called "Range_1", "Range_2", and "Size_3"). FIG. 7 shows the Keys panel selected from the FIG. 2 Toolbox subpanel. FIG. 8 shows the Sum panel selected from the FIG. 2 Toolbox subpanel. Finally, FIG. 9 shows the Output Format panel selected from the FIG. 2 Toolbox subpanel. Each of these panels includes a title bar, a window status icon, and a window sizing icon, with a window working space beneath each title bar. Each panel also includes display buttons for "OK", "Cancel", and "Help" functions, which those skilled in the art will recognize are typical for application program windows. The Output Format panel includes an "Add constant" display button. A variety of actions may be specified using the "Action" drop-down menu in each panel, the details of which may be specified as desired and otherwise should be apparent to those skilled in the art without further explanation.

Defining a Field Range with a Field Range Object

Figure 10:
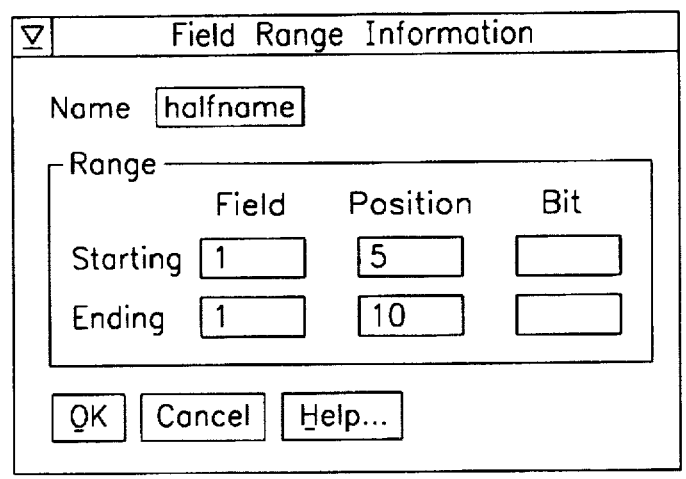
FIG. 10 is a representation of a Field Range Information display panel of the data arranger program, which is produced by dropping the Creator object into any of the Range Pool, Key, Sum, or Output Format display panels illustrated in FIGS. 6, 7, 8, or 9, or by selecting the appropriate field range Action from the respective panels.
Figure 11:
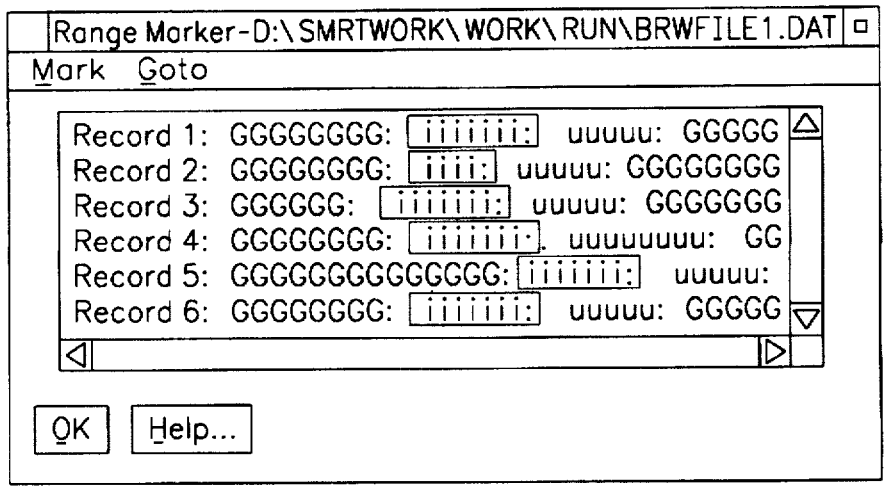
FIG. 11 is a representation of a Range Marker display panel of the data arranger program, which is produced by selecting a file name from the Task Properties display panel illustrated in FIG. 3.

As noted above, a Field Range Object designates starting and ending records comprising data input for a Task Object, including position and bit lengths relative to the input records. Information concerning the starting and ending positions are specified using a Field Range Information panel, illustrated in FIG. 10. The Field Range Information panel is displayed when the Creator Object 170 is dragged from the Application Window (FIG. 2) and dropped into one of the display panels illustrated in FIGS. 6, 7, 8, and 9, or can be produced from the Range Marker panel illustrated in FIG. 11. The Range Marker panel of FIG. 11 provides a graphical representation of the data within a data file, record by record. Different types of data can be indicated by different range marker panel characters. For example, a variety of graphical, integer, real number, display, or other types of data can be represented, including an "undefined" data type category indicated by "u" in FIG. 11.

More particularly, a data arranger program user can graphically designate bit patterns in a record from the Range Marker panel by moving the cursor to a desired beginning position and holding down the display mouse button (or pressing "control" on the keyboard) while dragging the cursor across the desired field range positions. When the user releases the display mouse button (or "control" key), the Field Range Information panel shown in FIG. 10 is produced on the display over the Range Marker panel shown in FIG. 11. The user then provides the requested information illustrated in FIG. 10, such as the Field Range Object name and the starting and ending positions and bit lengths. When the user then indicates approval of the designated field range, the data arranger program produces a Field Range Object display icon using an appropriate shape. The Field Range Object can be moved around the display panels from function to function, as described below.

Dragging the Creator Object 170 on one of the Toolbox subpanels of FIGS. 6 through 9 has the same effect as dropping a Field Range Object on the same panel in that the Field Range Information panel is displayed and the data arranger program defines a portion of an input data file to have a specific purpose according to the panel in which the Creator Object is dropped. For example, a Field Range Object dropped on the Keys panel (FIG. 7) defines the resulting Field Range Object as a key for a sort, merge, or check operation.

Manipulation of Field Range Objects

Figure 12:
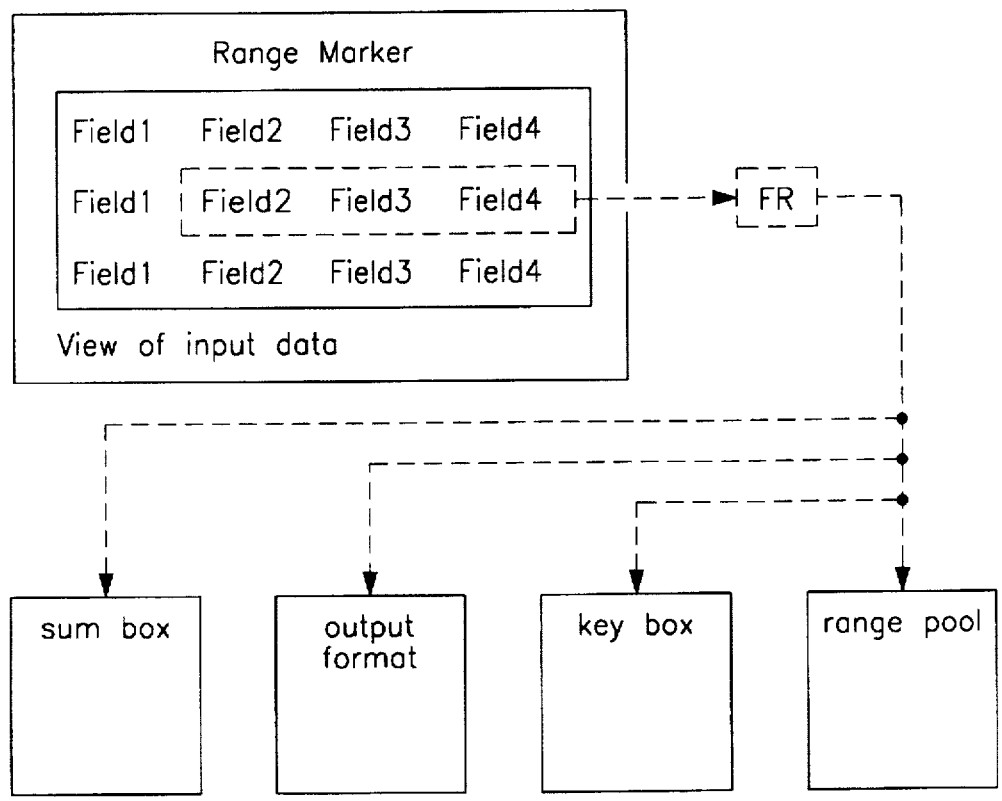
FIG. 12 is a representation of a main display application window showing a Field Range object being marked and dragged to multiple tool box panels of the data arranger program executed by the computer system illustrated in FIG. 1.

FIG. 12 shows a representation of the Range Marker panel with particular fields surrounded with a dotted line to indicate display highlighting such as represented in FIG. 11. In FIG. 12, the highlighted area is followed with a dotted line arrow pointing to a Field Range Object, indicated by "FR" in a dotted line box. The Field Range Object is shown with dotted lines leading to representations of a Range Pool panel, a Keys panel, a Sum panel, and an Output Format panel to indicate that the Field Range Object can be dragged from the Range Marker panel to any of the FIG. 2 Toolbox subpanel function boxes described above and dropped into the function box to implement an appropriate input format.

A Field Range Object that is dropped into the Keys function box, for example, defines a sort, merge, or check key, as selected by the user with the Keys function box "Action" drop-down menu (see FIG. 7). A Field Range Object dropped into the Range Pool box places that Field Range Object into the pool of objects from which a user may subsequently select. A Field Range Object dropped into the Sum function box defines a field range over which summation is to occur. Lastly, a Field Range Object dropped into the Output Format function box defines an operating range of an output function selected using the Output Format box "Action" menu. In this way, Field Range Objects will automatically define appropriate input parameters to the various function boxes into which they are dropped.

The automatic input parameter definition that follows from an initial specification of a field range using the Range Marker panel provides a means of easily duplicating specified portions of data files for input. That is, a Field Range Object that is initially defined for purposes of summation can be copied and used for the Keys function box by dragging the Field Range Object from the Sum function box to the Keys function box. The Field Range Object can be dragged and dropped into each one of the Toolbox function boxes, thereby providing a convenient, efficient means of graphically defining and selecting input portions of data files for multiple application program functions.

Additional Program Functions

Field Range Objects not only can be copied by dragging and dropping from function box to function box, they also may be deleted from the data arranger application program. In the preferred embodiment, the Field Range Objects can be deleted simply by dragging them from a function box to a display object that serves a deletion function.

Figure 13:
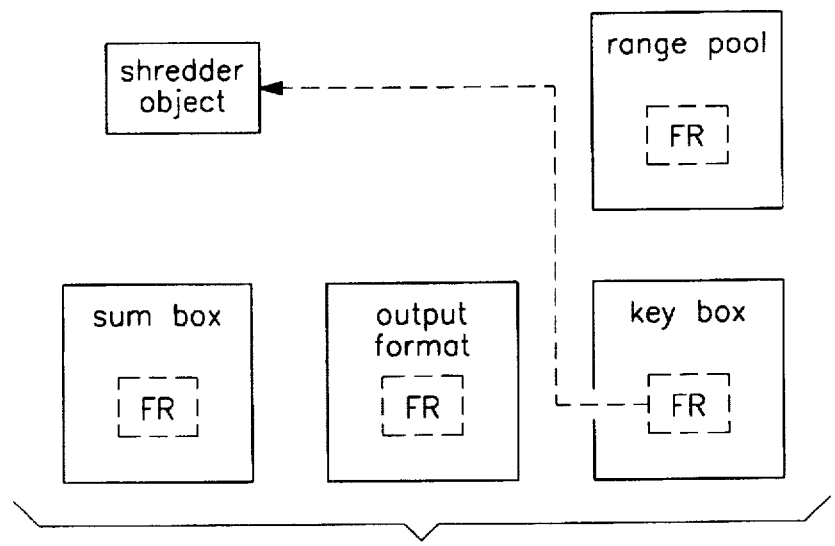
FIG. 13 is a representation of a main display application window showing deletion of Field Range objects with a shredder object of the data arranger program executed by the computer system illustrated in FIG. 1.

FIG. 13 is a display representation that shows a Field Range Object in a Keys function box with a dotted line leading to a display icon indicated as a "shredder object". The shredder object can comprise, for example, the task deleting object 172 shown in FIG. 2. Thus, both Task Objects and Field Range Objects can be deleted from the program memory by being dragged to the task deleting object.

When a Field Range Object is deleted by being dragged from a function box, the designated Field Range Object is deleted for that function only. If a Field Range Object is dragged from a Toolbox subfunction panel to the shredder object, then any corresponding Field Range Object in the other Toolbox subfunction panels will remain in the respective boxes. Thus, the FIG. 13 action of dragging the Field Range Object from the Keys box to the shredder object will result in deletion of the Field Range Object from the Keys box, but the Field Range Object in the Range Pool, Output Format, and Sum boxes will remain. Alternatively, a Field Range Object can be deleted from a function box by being highlighted and a delete function selected from the "Action" drop-down menu of the function box.

Defining Input

The data arranger program is capable of processing data files of many different types. For the data arranger program, a binary data file consists of one or more fields of data where each field might have a different data type. For example, a binary data file might have a data structure having text or character data followed by numerical integer data, followed by numerical double-precision data, followed by more text data. The data arranger program processes binary data files differently from data files having straight text information. A user specifies the structure of a binary data file so the data arranger program will properly process input taken from the file.

Figure 14:
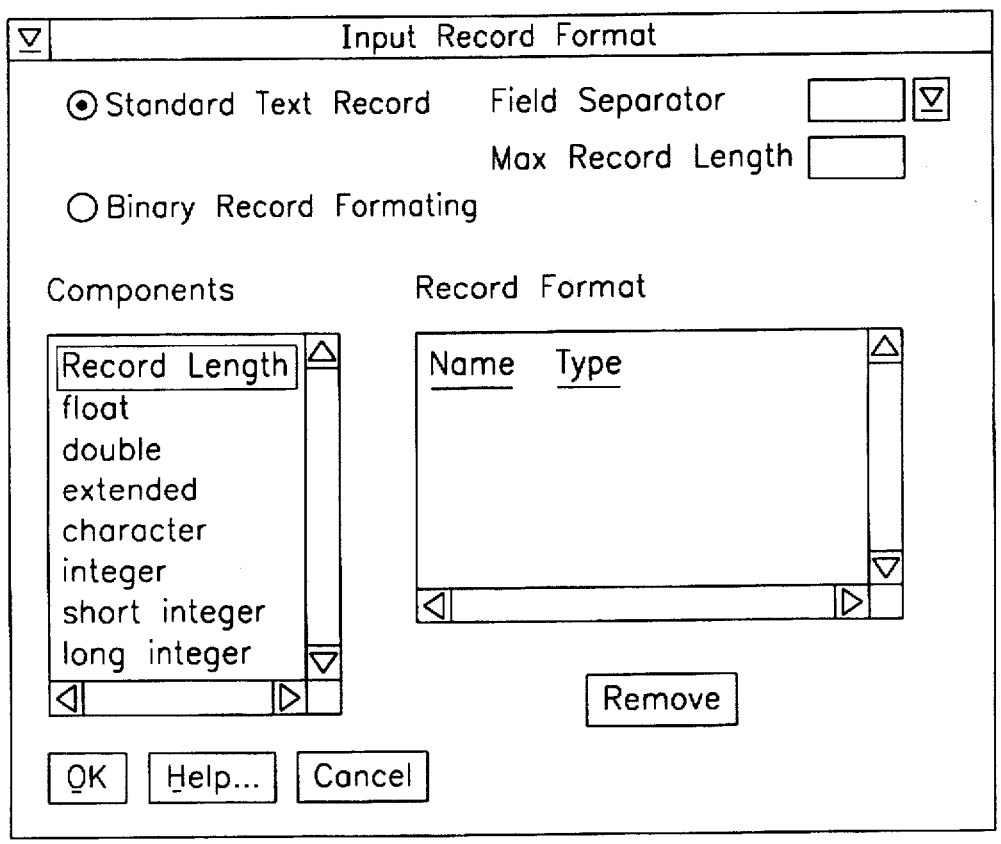
FIG. 14 is a representation of an Input Record Format display panel of the data arranger program executed by the computer system illustrated in FIG. 1.

FIG. 14 is a display representation of an Input Record Format panel with which a user specifies the structure of a data file. The Input Record Format panel includes display buttons for designating a standard, all-text data file and for designating a binary data file format. Two display boxes of the Input Record Format panel are labelled "Components" and "Record Format" and are used for designating the field components and data type details, respectively, of a data record that is to be retrieved and used for input to the data arranger program tasks.

Figure 15:
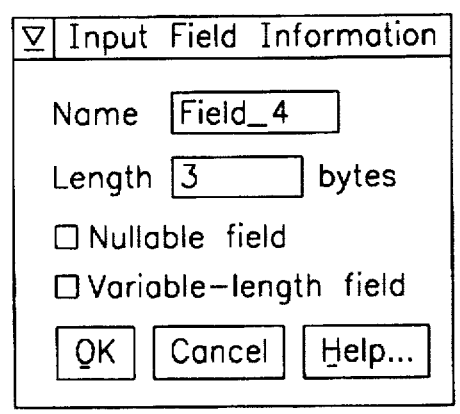
FIG. 15 is a representation of an Input Field Information display panel of the data arranger program executed by the computer system illustrated in FIG. 1.

More particularly, a user highlights a data type component from the Components list, drags the highlighted component to the Record Format box, and drops it there. Each time a data type component is dragged from the Components box to the Record Format box, an Input Field Information panel like that illustrated in FIG. 15 is displayed. The Input Field Information panel provides a means for the user to specify a name and length for the field range being defined. Thus, the Input Field Information panel includes a Name field and a Length field in which the user provides the desired parameter information.

For example, to define an input record having a data structure with ten bytes of character data followed by five bytes of packed decimal data, followed by a single integer digit, a user would first drag the "character" component from the Components list of the Input Record Format panel to the Record Format box. The use then would drag a "packed" component to the Record Format box, and then would drag an "integer" component to the Record Format box. Each time, the use would be shown the Input Field Information panel upon dropping the highlighted component in the Record Format box, and each time the user would supply the parameter information (name and length).

Each component dragged into the Record Format box defines a field within an input record. Because a field is a subset of a field range, each field is automatically placed in the field range pool panel (see FIG. 6), thereby comprising a Field Range Object. After being placed in the range pool panel, the Field Range Object can be manipulated (dragged and dropped) as described above.

The order in which components are placed in the Record Format box determines the order in which they will occur in the corresponding Field Range Object. The order in which they are dragged and dropped into the Record Format box, however, is not important. Thus, a component can be highlighted from the Components list and dropped before or after another component in the Record Format list. A component also can be taken from one position in the Record Format list and placed at another position, or can be dragged from the Record Format list and placed on the shredder object for deletion.

Output Filtering

The data arranger program permits a user to specify output format and selectively include or exclude data from the output created, as desired. For example, each record of a data file might contain date information for the record. A user might want to exclude a record from the generated output if the record contained a date earlier (or later) than a particular date. The data arranger program provides a panel to define a condition to eliminate records from the produced output and perform the selective filtering.

FIG. 16 is a display representation that shows a Filtering Information panel that provides a means for the user to specify selective filtering of output. The filtering is specified by building logical conditions having a statement format that may be represented as:

[condition 1] [relation] [condition 2], where [condition 1] and [condition 2] consist of any Field Range Object created by the user and [relation] is any one of the well-known logical operators such as less than (<), greater than (>), equal to (=), and so forth. These parameters are specified using the Condition Information box of the Filtering Information panel in FIG. 16. As shown in FIG. 16, [condition 2] also may be an alphanumeric constant (character or numeric) rather than a field range.

As each condition is specified by the user, the user names the condition and saves the condition to a condition pool using a "Save to Pool" display button shown in FIG. 16. The simple conditions can be used to build a selection condition for the output filtering, as illustrated by the "Final selection condition" box of FIG. 16. Simple conditions can be removed from the pool by highlighting the condition and selecting the "Remove" display button or by dragging the highlighted condition to the shredder object.

To build a final selection condition, a user can drag one or more simple conditions from the condition pool, along with one or more logical operators from among the four operators displayed as operator icons on the right side of the Filtering Information panel to the final selection condition box.

Specifying a comparison between a first Field Range Object and a second Field Range Object causes the data arranger program to compare the field range specified by each Field Range Object within each record processed to determine whether the entire record should be included or excluded from the generated output. Specifying a comparison between a Field Range Object and an alphanumeric constant causes the data arranger program to compare the field range in each record with the specified constant to determine inclusion or exclusion. A record is included in the generated output unless a filter criteria (selection condition) is satisfied, in which case the record is excluded.

Output Preview

The user can examine the result of all options and parameters specified and thereafter encapsulated in a Task Object by preprocessing a portion of the input data. An Output Preview panel is provided by the data arranger program to provide a means for the preprocessing and preview.

FIG. 17 is a display representation of the Output Preview panel, which includes a box for indicating the input records to be previewed, a box for entering preview criteria, and a window for viewing the preview data. A user specifies input records to be preprocessed in the "Input Records to Preview" box. The user may optionally enable or disable specific output functions, such as sorting, filtering, or reformatting through appropriate display buttons. This permits viewing the preprocessed data in different ways.

When the user presses the "OK" display button, the data arranger program retrieves the input records specified in the input records box and applies all previously defined functions for the corresponding Task Object to that data. The resulting output is displayed in the preview window. In this way, the user can verify that parameters and options comport with what was intended, without the need for processing all of the input data. This is highly advantageous, because input data can comprise many megabytes of data. Thus, the Output Preview panel saves time for a user by permitting analysis of specified parameters and selecting options and permitting early discovery of changes that should be made to Task Object operations.

Input File Selection

Input files can be located and selected from all the stored files available to the user in one of two ways: first, by dragging the Creator Object 170 from the Application Window (FIG. 2) to the Input Files list area of the Task Properties panel (FIG. 3) and, second, by selecting the "Add file" display button of the Task Properties panel. When either of these actions is taken, the data arranger program displays a file selection panel for selection of an input file.

Figure 18:
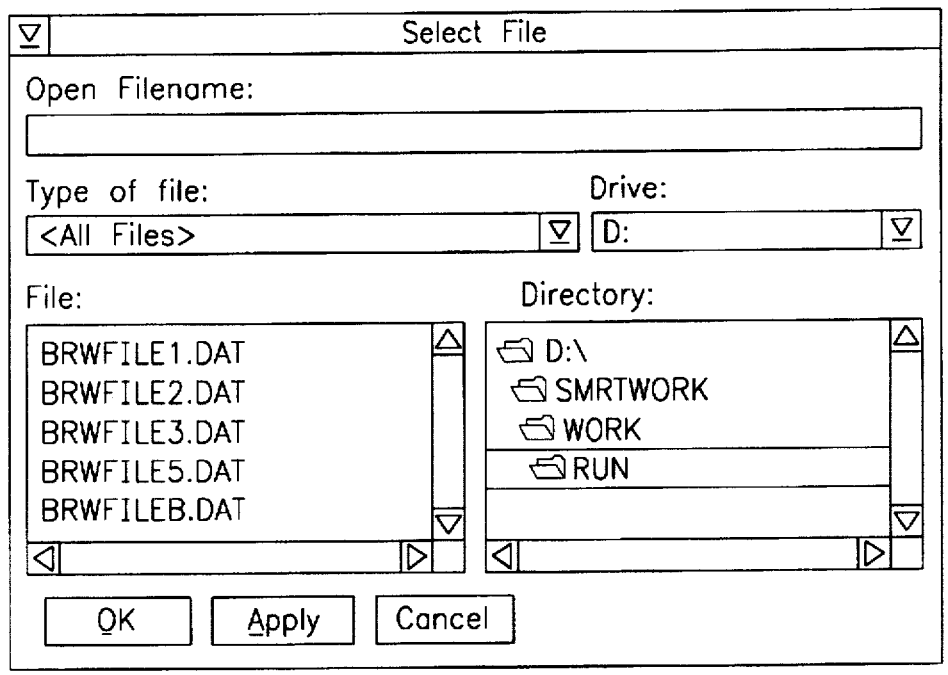
FIG. 18 is a representation of a File Selection display panel of the data arranger program executed by the computer system illustrated in FIG. 1.

FIG. 18 is a display representation of a Select File panel that permits a user to graphically specify an input file. That is, a user can view and select input files without typing file pathname data. This is achieved by using drop-down menu functions and directory operations, as illustrated in FIG. 18. A storage drive can be selected using the "Drive" box, a directory can be selected using the "Directory" box, a file type can be selected using the "Type of file" box, and files stored in the selected directory can be viewed in the "File" box. A particular file is selected by highlighting the file, which can be opened using the "Open" box. The selected file can be added to the "Input Files" box of FIG. 3 by selecting the "OK" display button of FIG. 18.

Specification of File Organization

The Toolbox subpanel of the Task Properties panel shown in FIG. 3 includes a File Organization function, which permits a user to specify a file organization attribute for each input file and output file that is defined. In the preferred embodiment, the data arranger program includes a file organization panel that provides a means for the user to specify the file organization.

Figure 19:
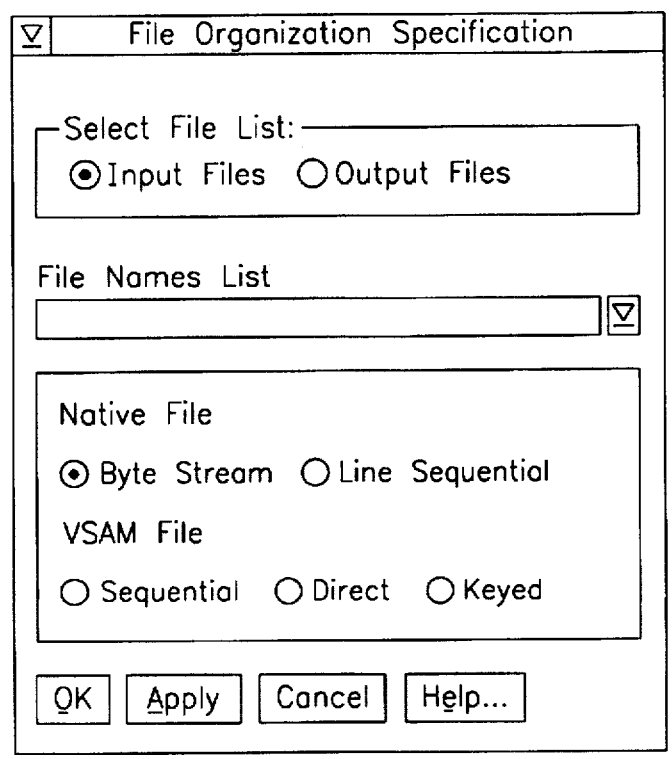
FIG. 19 is a representation of a File Organization display panel of the data arranger program executed by the computer system illustrated in FIG. 1.

FIG. 19 is a display representation of the File Organization Specification panel, which includes a box from which a user indicates whether the specified organization is for an input file or for an output file. The panel also includes a box for a file names list and for indicating a native file (from the user's system) or a VSAM file (from the network).

APPLICATION PROGRAM DESIGN

As noted above, the preferred embodiment of the invention is implemented in an object-oriented programming environment. There are many different ways of communicating a suitable data structure and organization that implements the functions, features, and operations described above because there are different notational systems for describing object-oriented programming implementations. One way of describing an application program that provides a satisfactory implementation is to use the notation system developed by J. Rumbough (see, for example, Rumbough, J. et al., *Object-Oriented Modeling and Design*, Prentice-Hall, 1990).

FIGS. 20 through 25 are object model representations of an exemplary application program structure that implements the features described above. In the drawing figures, only class names of the respective object classes are shown. Those skilled in the art will be able to select the details of the class attributes and operations, in view of the descriptions above and the program flow diagrams that follow, without further explanation.

The object-oriented application program that implements the features of the preferred embodiment, as illustrated in FIGS. 20–25, may be better understood as comprising three major parts. The first two parts include a combined Visualization level model and Interaction level model, depicted in FIG. 20 and FIG. 21, which represent the framework of the application program graphical user interface (GUI) design. The third part is the Application level model, depicted in FIGS. 22 through 25, which consists of a set of application-specific data objects, derived from a generic class called "AppObjectInfo". Each of these objects has its own specific data (attributes) and redefines (overloads) some virtual functions of the base class.

Initializer

Figure 20:
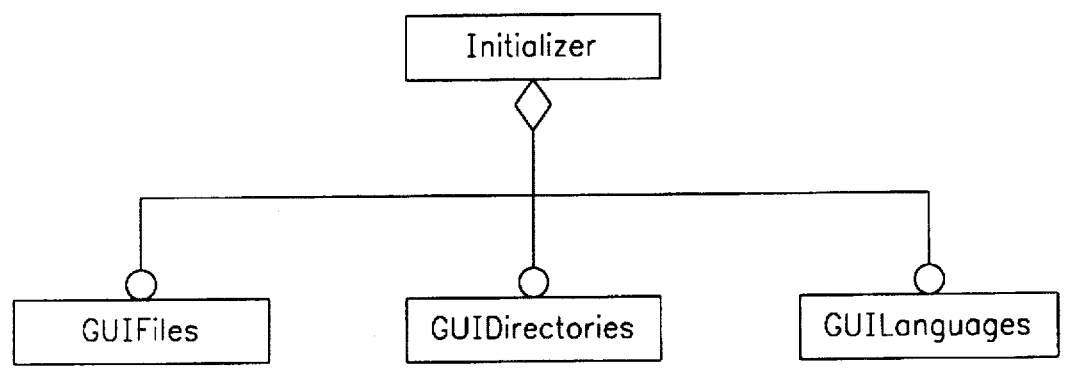
FIG. 20 is an object model, interaction level representation of the Initializer object class contained in the data arranger program executed by the computer system illustrated in FIG. 1.

FIG. 20 shows that the preferred embodiment includes an Initializer aggregate class having component classes called GUIFiles, GUIDirectories, and GUILanguages (it should be noted that, as is conventional with Rumbough and other object-oriented notation systems, multiple-word class names are written as one word). The Initializer class is responsible for initializing the GUI environment and for loading and saving application data objects from and to task files. The Initializer class has no direct relationships with the other objects of the GUI.

The GUIFiles class contains objects (in the C++ programming language, these might also be referred to as instances of standard C++ stream classes) for recording application program (GUI) operations and for saving output data produced by the Task Object operations. The GUIDirectories class contains Name class object instances of directory names used by the GUI. The GUILanguages class contains Name class object instances for storing the languages supported by the GUI. Each of the objects in these classes includes LoadIniFile methods for loading operations from the Options panel (see FIG. 4) and SaveIniFile methods for saving user-selected options from the Options panel.

Registrar

Figure 21:
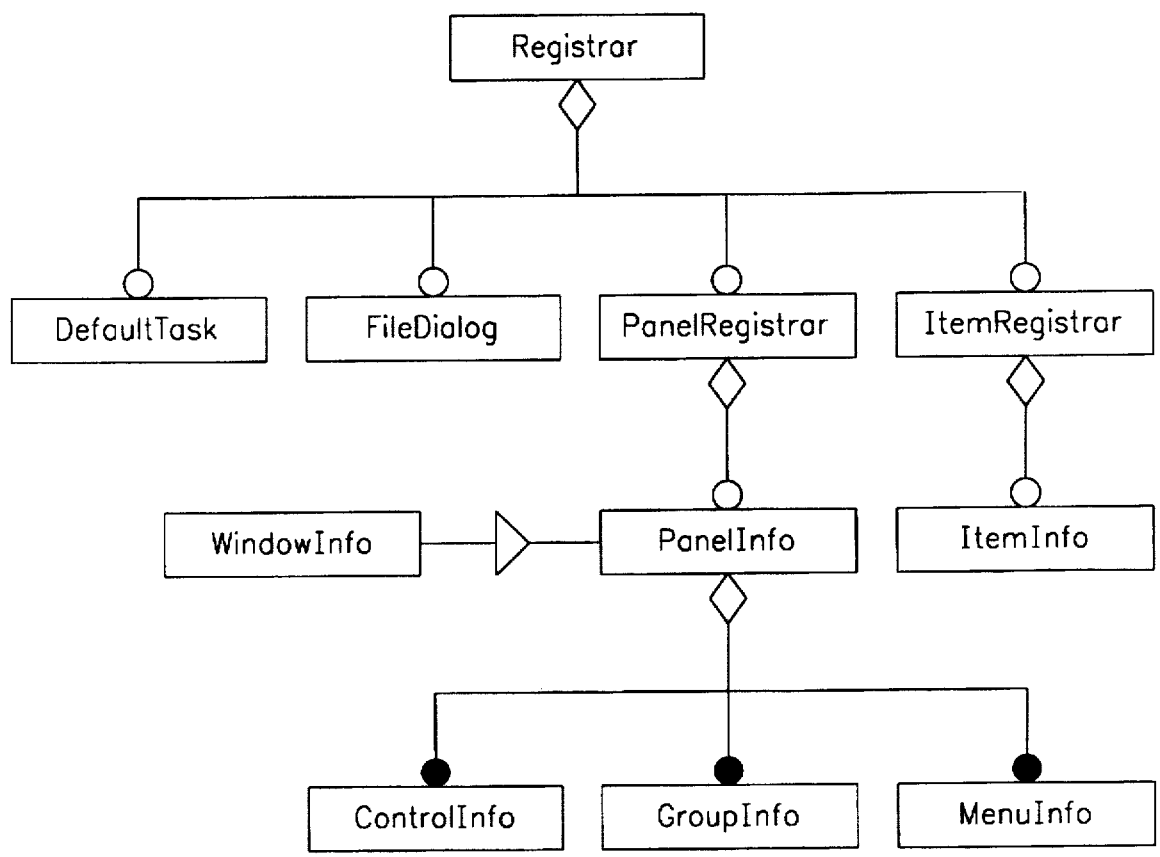
FIG. 21 is an object model, interaction level representation of the Registrar object class contained in the data arranger program executed by the computer system illustrated in FIG. 1.

FIG. 21 shows a Registrar aggregate class of the preferred embodiment and the component classes called DefaultTask, FileDialog, PanelRegistrar, and ItemRegistrar. There is one instantiation of an object for the Registrar class in the GUI. The Registrar class object is responsible for creating and maintaining a PanelRegistrar register of all panel information objects, creating and initializing default Task objects, creating application data objects and sending them to appropriate data carriers, creating and maintaining a register of auxiliary objects, and performing data management tasks relating to the panel information objects and auxiliary objects.

The Registrar class FileDialog, as depicted in FIG. 21, supports standard GUI File dialog operations. The DefaultTask class is the only instance of the SortTask class described further below. The PanelRegistar class contains a list of PanelInfo objects and WindowInfo objects for managing the window displays. The ItemRegistrar class contains a list of item information objects described further below. The objects in these classes include GiveAppObject methods for creating application objects and passing their respective pointers to corresponding ControlInfo objects and to DefaultTask objects, as described further below, InitDefaultTask methods for initializing DefaultTask object data, and SaveDefaultTask methods for saving current DefaultTask object data.

PanelRegistrar-PanelInfo Class

The PanelRegistrar class is an aggregate class of a component class called PanelInfo, which is a superclass for a WindowInfo class and which is an aggregate of the classes ControlInfo, GroupInfo, and MenuInfo. The PanelInfo class is responsible for defining the GUI display panel structure and behavior, supporting all user interactions (including interpreting and responding to user keyboard and display device actions), creating appropriate control information objects of ControlInfo, and performing data management tasks relating to the control information and other GUI control objects, such as display menus and the like. Each display panel that provides a visual display includes conventional window features and responses, and therefore has a corresponding internal object representation as an instance, or instantiation, of an object in the PanelInfo class. Those skilled in the art will understand the way in which display panel elements can be defined using classes of objects to provide the panels described above. For example, the PanelInfo objects include attributes and methods that identify panel controls and display buttons, pointers to window procedures, control groups, display menu bars, save procedures, cancel procedures, tutorial procedures, checking procedures, menu action procedures, and message handling procedures.

In the preferred embodiment, the PanelInfo class of the data arranger application program includes data comprising: PanelID, a panel identifier defined in a layout panel definition file (.PDF file), a file type that is conventional for layout of window operating systems; TitleID, a reference identifier to the panel; HelpID, a reference identifier for the panel help file in the .HLP file; TutorID, a reference identifier to a panel tutorial; ParentID, a panel identifier for the "parent" panel of the subject panel; SubclassProcedure, a pointer to an optional subclass window procedure for the subject panel; DefaultProcedure, a pointer to a default window procedure; ControlList, a list of object representations for internal panel controls defined in a layout .PDF file; GroupList, a list of object representations for control groups, and MenuBar, a representation of the panel menu bar with standard window options.

The PanelInfo class of the preferred embodiment also includes procedures, also referred to as methods. Typical object-oriented programming notation lists procedure names followed by left and right parenthesis. The procedures of the data arranger program include GetPanel(), a preparatory procedure for the display panel that loads a panel from the .PDF library; InitPanel(), an initialization procedure for the panel that initializes visual display objects; SavePanel(), a saving procedure for the panel; CancelPanel(), a cancelling procedure for the panel to cancel display object changes; GetTutorPanel(), an opening procedure for a tutorial of the panel; AppObj ectAccept(), a checking procedure for an application object (AppObjectInfo); ExecuteMenuAction(), a typical menu action procedure for panel control; and the various message handlers for responding to user input.

The PanelInfo class also includes other procedures, including a default class window procedure called ApplicationPanelProcedure() that is responsible for opening next-window panels with identifiers specified in .PDF files, as a function of pushbuttons, list items, menu items, and container records, and also for panel termination. Each panel may also have subclass procedures to support special behaviors of the panel, depending on the procedures provided by the application program. An application panel is displayed on the user screen when its "parent" panel receives a message to open the next panel with a specified panel identifier.

ControlInfo Class

The ControlInfo objects of the PanelInfo class are responsible for defining GUI information elements, such as display entry fields, display containers, lists, and the like; is responsible for supporting user interactions, and for maintaining appropriate application data objects. Each internal panel control containing any application data has a corresponding object instance, also called an instantiation, of an object in the ControlInfo class. Those skilled in the art will understand the way in which display panel elements can be defined using classes of objects to provide the panels described above. For example, the ControlInfo objects include attributes and methods that identify application control information, application objects, and pointers to application objects and control procedures.

In the preferred embodiment, the data arranger application program includes data comprising: ControlID, a control identifier defined in a layout panel definition file (.PDF file); ControlType, a control type identifier such as container, list, and the like; AppObjectID, an application object class corresponding to the control information class; DefaultItemID, a reference identifier for containers and lists used for the creation of new objects for the subject control object; AppObject, a pointer to a corresponding application object; SubclassProcedure, a pointer to a subclass procedure for the control object; and DefaultProcedure, a pointer to a default window procedure.

GroupInfo Class

The GroupInfo objects of the PanelInfo class represent control groups corresponding to display panel control groups, known to those skilled in the art. Thus, such GroupInfo objects identify the number of entities in the control group and the control identifier for the application window.

The GroupInfo class objects include data comprising: GroupID, a reference identifier of the control group; EntityCount, a count of the number of entities in the control group; and EntitySet, a set of entities, each containing control information such as a ControlID data, a control type, and a control state.

MenuInfo Class

The MenuInfo objects of the PanelInfo class represent menu bars of the application display panels. For example, some standard window menu options include New, Update, Delete, Help, and Save. Each menu item that is associated with an application action is associated with a corresponding MenuInfo object. The MenuInfo objects will include methods that execute the needed menu actions, as defined by the application program. For example, for each panel control button that contains records such as containers or drop-down lists, four standard display actions that are supported include New, Update, Delete, and Help. In this way, the MenuInfo objects provide automatic execution of the menu actions for each display panel.

Thus, each GUI display panel of the application will include GetPanel() methods and InitPanel() methods for carrying out window procedures for opening display panels in response to user selection of display buttons and program commands, as specified by window panel definition files (.PDF files). These methods control display panel pushbuttons, list items, menu items, container records, and display destroy methods for panel termination. Other panel-related methods will occur to those skilled in the art in accordance with particular application implementations.

WindowInfo Class

The WindowInfo class, for which PanelInfo is a superclass, contains methods for message handling that indicate user display actions. That is, for each GUI display panel whose behavior might not be supported by standard window message processing, the WindowInfo class includes an object that supports or provides behaviors that the panel should exhibit. Such methods include behaviors such as window drag, window drop, button up and button down, mouse movement, scrolling, character input, and display painting.

ItemRegistrar—ItemInfo Class

The ItemInfo objects of the ItemRegistrar class include attributes and methods corresponding to application display items. Each GUI folder, such as a display container or list, contains records of one or more predefined types. Each record type corresponds to an object definition, represented by an object of the ItemInfo class. The information referenced by the ItemInfo objects includes record type reference identifiers, application object class identifiers for associated record types, panel identifiers for the data record types, "help" message type identifiers, and record type default names. Those skilled in the art will understand how the item information is used with the other application objects to provide needed display behavior.

Application Level Class Diagrams

As noted above, FIGS. 22, 23, 24, and 25 illustrate application level object classes for the preferred embodiment of the data arranger application program that provides the features of the invention. It should be understood that the classes shown in FIGS. 22–25 represent but one arrangement of object classes that can provide the features of the invention. Those skilled in the art will appreciate that other, different selections of object classes also can provide the features, and will understand how to make such selections in accordance with particular implementations of the data arranger program, in view of the description above.

AppObjectInfo Class

Figure 22:
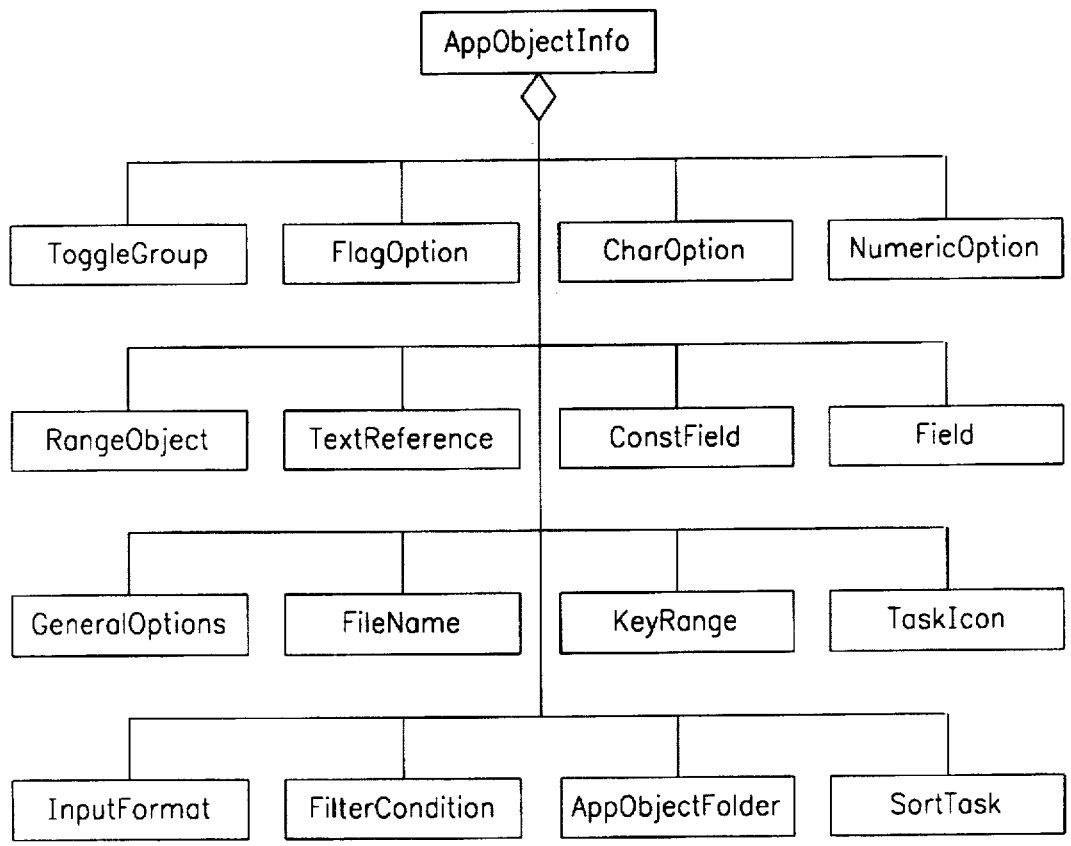
FIG. 22 is an object model, application level representation of the Application object class contained in the dam arranger program executed by the computer system illustrated in FIG. 1.

FIG. 22 shows an AppObjectInfo aggregate class and its component classes comprising: ToggleGroup, FlagOption, CharOption, NumericOption, RangeObject, TextReference, ConstField, Field, GeneralOptions, FileName, KeyRange, TaskIcon, InputFormat, FilterCondition, AppObjectFolder, and SortTask. The AppObjectInfo class is responsible for defining application-specific data objects, maintaining user data needed to build appropriate application-specific command options, and performing data flow control and checking functions.

It should be apparent that the object classes shown in FIG. 22 correspond to features of the data arranger program described above, and the attributes and methods of the objects should be apparent from the description of the features. The particular attributes and methods of the objects for a particular implementation will depend on the system operation and programming environment of the implementation and the exact features desired by the user, as known by those skilled in the art.

In the preferred embodiment, the AppObjectInfo class includes data attributes called: ObjectDefinition, a data structure that contains data such as ObjectID to identify an application object type, PanelID for the application object owner panel identifier, ControlID for the object owner control identifier, and SubControlID for panel containers and lists; ObjectName, the name of the application object instantiation; ObjectMarks, a set of Boolean flags defining the application object status (for object folders); and CommandOption, a general specification data associated with each application object.

The AppObjectInfo class also includes methods called: GetColumnsCount() and GetColumnsData(), which permit building object representations in a display container; AssignAppData(), which copies data from another application object; LinkSubObjects(), which links internal application subobjects with corresponding parent objects; BuildObjectList(), which saves specific object attributes; and BuildCommandOption, which builds command options.

ToggleGroup, ConstField, FilterCondition, and Field Classes

Figure 23:
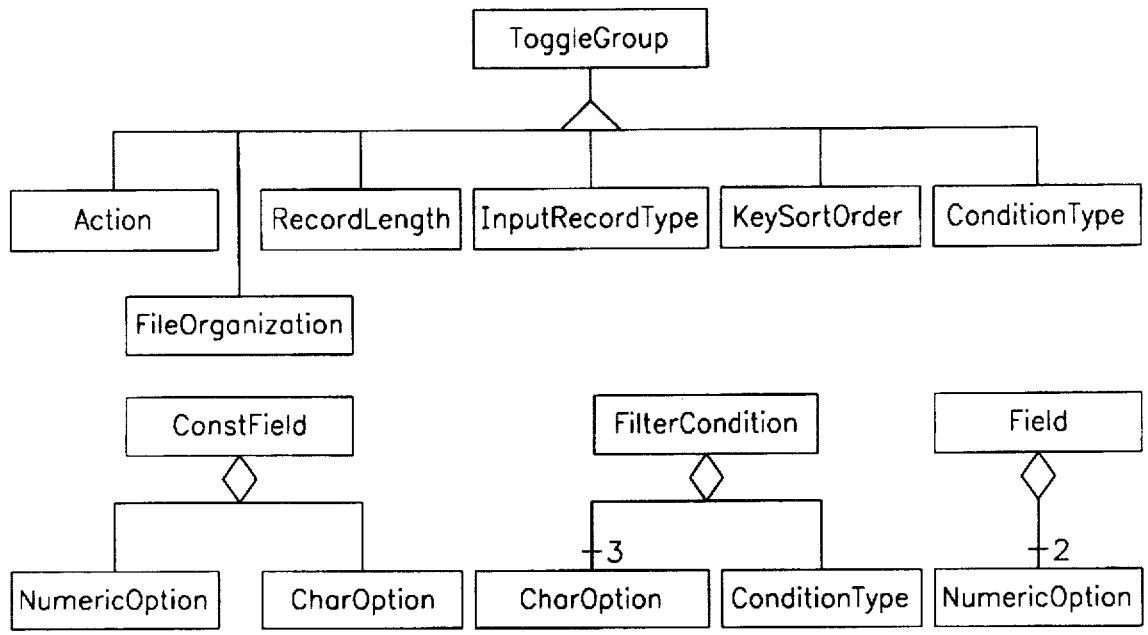
FIG. 23 is an object model, application level representation of the Toggle Group, Constant Field, Filter Condition, and Field Definition object classes contained in the data arranger program executed by the computer system illustrated in FIG. 1.

FIG. 23 shows a ToggleGroup class that is a superclass for the subclasses of Action, FileOrganization, RecordLength, InputRecordType, KeySortOrder, and ConditionType. FIG. 23 also shows that the classes NumericOption and CharOption shown in FIG. 22 also are related as component classes of the FIG. 22 class ConstField. FIG. 23 also shows that the classes CharOption and ConditionType are component classes of the aggregate class FilterCondition, and the class NumericOption is a component class for the Field class.

As with FIG. 22 above, it should be apparent that the object classes shown in FIG. 23 correspond to features of the data arranger program described above, and the attributes and methods of the objects should be apparent from the description of the features. Again, the particular attributes and methods of the objects for a particular implementation will depend on the system operation and programming environment and the exact features desired by the user.

Key Range, InputField, InputFormat, and GeneralOptions Classes

Figure 24:
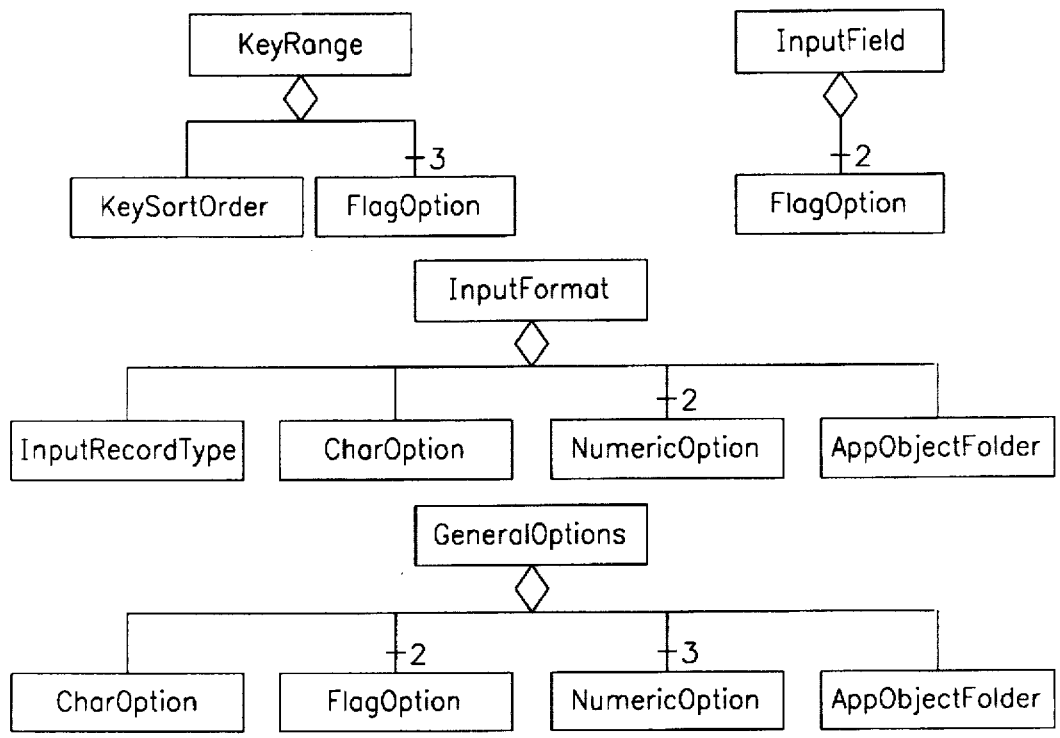
FIG. 24 is an object model, application level representation of the Key Range, Input Field, Task Input Format, and Task General Options object classes contained in the data arranger program executed by the computer system illustrated in FIG. 1.

FIG. 24 shows that the KeyRange class is an aggregate class comprising KeySortOrder objects and FlagOption objects. FIG. 24 shows that the InputField class is an aggregate having FlagOption objects. FIG. 24 shows that the InputFormat class is an aggregate class for the component classes of InputRecordType, CharOption, NumericOption, and AppObjectFolder. Lastly, FIG. 24 shows that the GeneralOptions class is an aggregate class having objects from the classes CharOption, FlagOption, NumericOption, and AppObjectFolder.

As before, the object classes shown correspond to features of the data arranger program described above, and the attributes and methods of the objects should be apparent from the description of program features. Again, the particular attributes and methods of the objects will depend on the system operation and programming environment of a particular implementation, and the exact features desired by the user, as known by those skilled in the art.

FileName and SortTask Classes

Figure 25:
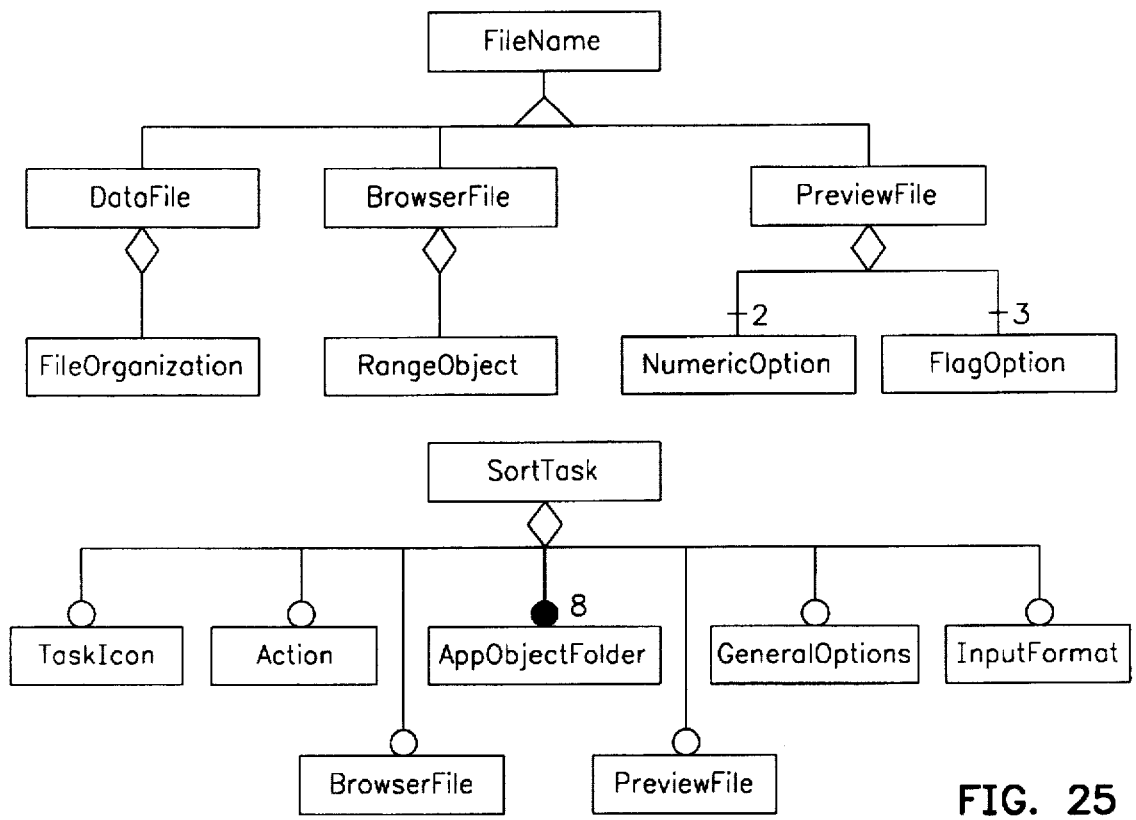
FIG. 25 is an object model, application level representation of the File Name and Sort Task object classes contained in the data arranger program executed by the computer system illustrated in FIG. 1.

FIG. 25 shows that the FileName class is a superclass of the classes DataFile, BrowserFile, and PreviewFile. FIG. 25 also shows that the DataFile class is an aggregate class of FileOrganization, that BrowserFile is an aggregate class of RangeObject, and that PreviewFile is an aggregate class of both NumericOption objects and FlagOption objects. Lastly, FIG. 25 shows that SortTask is an aggregate class from components TaskIcon, Action, BrowserFile, AppObjectFolder, PreviewFile, GeneralOptions, and InputFormat.

As before, the object classes shown correspond to features of the data arranger program described above, and the attributes and methods of the objects should be apparent from the description of program features. Again, the particular attributes and methods of the objects will depend on the system operation and programming environment of a particular implementation, and the exact features desired by the user, as known by those skilled in the art.

PROCEDURAL OPERATION

Figure 26:
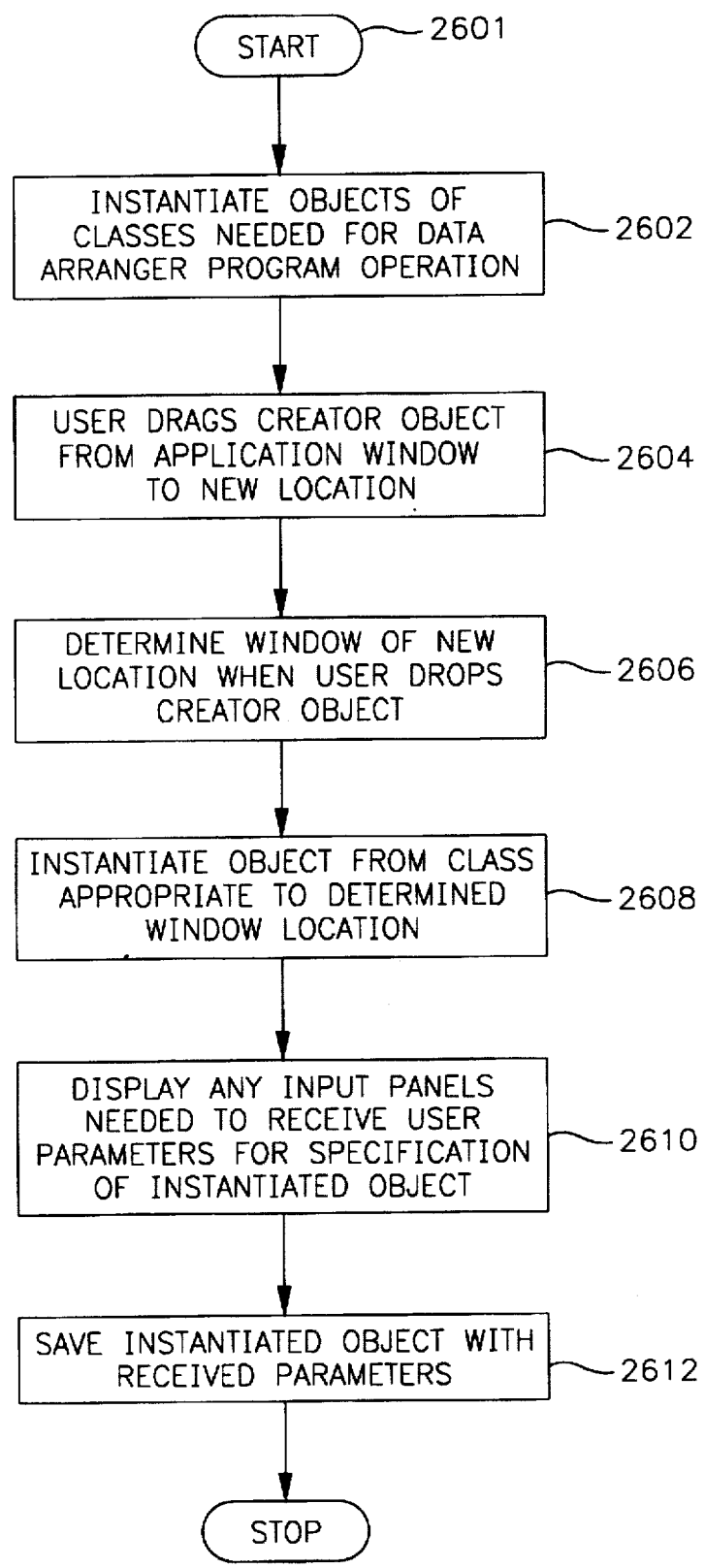
FIG. 26 is a flow diagram that represents data arranger program processing to receive user Creator Object manipulation and object creation, as performed by the computer system illustrated in FIG. 1.

The operation of the data arranger application program described above will be more readily apparent with references to the flow diagram of FIG. 26.

Implementing the Creator Object

Before a Creator Object can be utilized, first the object oriented programming environment must be provided and the data arranger program of the preferred embodiment must be started, or launched, which automatically results in instantiation of the objects from the classes needed for the data arranger program. This processing step is represented in FIG. 26 by the flow diagram box numbered 2602. Such initialization processing involves application program global option initialization (read from the Options file), storage of the options into the Initializer object, creation of necessary PanelInfo, WindowInfo, and ItemInfo objects, and registration of such created objects in the corresponding Registrar objects. The initialization processing also includes creation of the Panel List file, which permits registration of the display panels to create instances of the PanelInfo objects, and the Item List file, which permits registration of the panel items to create instances of the ItemInfo objects. Lastly, initialization requires that all predefined application objects are created (AppObjectInfo objects) and are bound or linked with corresponding ControlInfo objects. It should be apparent that the object classes shown correspond to features of the data arranger application program described above, and the attributes and methods of the objects should be apparent from the description of program features. Again, the particular attributes and methods of the objects will depend on the system operation and programming environment of a particular implementation, and the exact features desired by the user. One of the objects instantiated in the initialization processing will be the Creator Object described previously.

The next processing step in executing the Creator Object described above is for the data arranger program of the preferred embodiment to detect when the user drags the Creator Object from the Application Window to a new display location. This is represented in FIG. 26 by the flow diagram box numbered 2604. Those skilled in the art will understand that GUI programs include means for determining display cursor movement and button activation, and will recognize how to utilize such information to implement this processing step, without further explanation. The GUI program next determines when the user drops the Creator Object in a new window, as represented by the flow diagram box numbered 2606. Again, such information is typically known or conveyed to a GUI application program, as will be recognized by those skilled in the art.

When the data arranger program determines that the user has dropped the Creator Object in a window, the data arranger program also knows the object class corresponding to the window. That is, the window in which the Creator Object is dropped corresponds to an object of one of the display window classes that were instantiated in the step represented by the flow diagram box numbered 2602. The data arranger program therefore has information about the desired object to be created, based on the parameters for the class and objects of the window in which the Creator Object was dropped. Accordingly, the flow diagram box numbered 2608 in FIG. 26 shows that the next processing step is for the data arranger program to instantiate an object that is appropriate to the determined window location when the Creator Object was dropped.

In accordance with the parameters for instantiating an object, the data arranger program next displays whatever input panels are needed to receive the parameters from the user to complete the object definition. This processing step is represented in FIG. 26 by the flow diagram box numbered 2610. Next, the data arranger program saves the parameters and other data structures needed for the instantiated object, as indicated by the flow diagram box numbered 2612. This concludes processing for a drag-and-drop action with the Creator Object.

ADVANTAGES OF THE INVENTION

As described above, the present invention provides a graphical user interface (GUI) application program implemented in an object oriented programming language that permits a user to automatically instantiate new program objects by dragging a Creator Object from one GUI window to a new GUI window and dropping it in the new window. If needed, the user is automatically prompted to provide parameters needed for the object instantiation according to the window in which the object is dropped. This provides an easier way for a user to specify a program operation and the data or resources involved in the operation.

The present invention has been described above in terms of a presently preferred embodiment so that an understanding of the present invention can be conveyed. There are, however, many configurations for graphical user interfaces not specifically described herein but with which the present invention is applicable. The present invention should therefore not be seen as limited to the particular embodiment described herein, but rather, it should be understood that the present invention has wide applicability with respect to graphical user interfaces generally. All modifications, variations, or equivalent arrangements that are within the scope of the attached claims should therefore be considered to be within the scope of the invention.

We claim:

1. A method of operating a computer system having a display, one or more data storage devices, and an object-oriented application program for manipulation of data files, the method comprising the steps of:

instantiating objects needed for execution of the application program;

producing an instantiation object of the application program on the display;

receiving user input that causes the instantiation object to be dragged about the display and dropped in a destination window;

determining the destination window in which the instantiation object was dropped; and responding to user dropping of the instantiation object by instantiating a member of an object class of the application program represented by the destination window.

2. A method as defined in claim 1, wherein the step of responding comprises receiving parameters from the user that define the instantiated object class member.

3. A method as defined in claim 2, wherein the step of responding further comprises displaying one or more display panels that permit the user to provide the object parameters.

4. A method as defined in claim 2, wherein the received parameters specify attributes or behaviors of the object class members.

5. A method as defined in claim 1, further including the step of storing the received parameters for the instantiated object in the data storage devices.

6. A method as defined in claim 1, wherein the instantiated object comprises a display task icon that represents a user-designated sequence of application program data operations on one or more data files, such that the application program responds to user selection of the display task icon by initiating execution of the application program data operations on the data files.

7. A method as defined in claim 1, wherein the instantiated object comprises a field range icon that represents a field range in one or more data records contained in a data file that will be used as input to data operations of the application program such that the execution of the data operations will occur on the field range.

8. A method of executing an object-oriented application program to permit user instantiation of application program objects of a computer system having a display and one or more data storage devices, the method comprising the steps of:

producing an instantiation object of the application program on the display;

receiving user input that causes the instantiation object to be dragged about the display and dropped in a destination window of the application program;

determining the destination window in which the instantiation object was dropped; and responding to user dropping of the instantiation object by instantiating a member of an object class of the application program represented by the destination window.

9. A method as defined in claim 8, wherein the step of responding comprises receiving parameters from the user that define the instantiated object class member.

10. A method as defined in claim 9, wherein the step of responding further comprises displaying one or more display panels that permit the user to provide the object parameters.

11. A method as defined in claim 9, wherein the received parameters specify attributes or behaviors of the object class members.

12. A method as defined in claim 8, further including the step of storing the received parameters for the instantiated object in the data storage devices.

13. A method as defined in claim 8, wherein the instantiated object comprises a display task icon that represents a user-designated sequence of application program data operations on one or more data files, such that the application program responds to user selection of the display task icon by initiating execution of the application program data operations on the data files.

14. A method as defined in claim 8, wherein the instantiated object comprises a field range icon that represents a field range in one or more data records contained in a data file that will be used as input to data operations of the application program such that the execution of the data operations will occur on the field range.

15. A computer system for execution of an object-oriented application program that permits user instantiation of application program objects, the computer system comprising:

a processing unit executing the object-oriented application program;

a data storage device in which data is stored;

a display; and an instantiation object of the application program that can be dragged about the display by the user and dropped in a destination window, whereupon the application program determines the destination window in which the instantiation object was dropped and responds by automatically instantiating a member of an object class of the application program represented by the destination window.

16. A computer system as defined in claim 15, wherein the application program further responds to dropping of the instantiation object by receiving parameters from the user that define the instantiated object class member.

17. A computer system as defined in claim 16, wherein the application program further responds to dropping of the instantiation object by displaying one or more display panels that permit the user to provide the object parameters.

18. A computer system as defined in claim 16, wherein the received parameters specify attributes or behaviors of the object class members.

19. A computer system as defined in claim 15, wherein the application program further responds to dropping of the instantiation object by storing the received parameters for the instantiated object in the data storage device.

20. A computer system as defined in claim 15, wherein the instantiated object comprises a display task icon that represents a user-designated sequence of application program data operations on one or more data files, such that the application program responds to user selection of the display task icon by initiating execution of the application program data operations on the data files.

21. A computer system as defined in claim 15, wherein the instantiated object comprises a field range icon that represents a field range in one or more data records contained in a data file that will be used as input to data operations of the application program such that the execution of the data operations will occur on the field range.

22. A program product for use in a computer system, the program product comprising:

a signal bearing media; and a sequence of instructions executable by the computer system, the sequence providing an object-oriented application program that instantiates objects needed for execution of the application program, produces an instantiation object of the application program that can be dragged about the display by the user and dropped in a destination window, whereupon the application program determines the destination window in which the instantiation object was dropped and responds by automatically instantiating a member of an object class of the application program represented by the destination window.

23. A program product as defined in claim 22, wherein the application program further responds to dropping of the instantiation object by receiving parameters from the user that define the instantiated object class member.

24. A program product as defined in claim 23, wherein the application program further responds to dropping of the instantiation object by displaying one or more display panels that permit the user to provide the object parameters.

25. A program product as defined in claim 24, wherein the received parameters specify attributes or behaviors of the object class members.

26. A program product as defined in claim 22, wherein the application program further responds to dropping of the instantiation object by storing the received parameters for the instantiated object in the data storage device.

27. A program product as defined in claim 22, wherein the instantiated object comprises a display task icon that represents a user-designated sequence of application program data operations on one or more data files, such that the application program responds to user selection of the display task icon by initiating execution of the application program data operations on the data files.

28. A program product as defined in claim 22, wherein the instantiated object comprises a field range icon that represents a field range in one or more data records contained in a data file that will be used as input to data operations of the application program such that the execution of the data operations will occur on the field range.

29. A program product as defined in claim 22, wherein the signal bearing media comprises recordable media.

30. A program product as defined in claim 22, wherein the signal bearing media comprises transmission media.

* * * * *